(12) United States Patent
Nash et al.

(10) Patent No.: US 7,793,569 B2
(45) Date of Patent: Sep. 14, 2010

(54) WRENCH

(75) Inventors: Derek J. Nash, Huntersville, NC (US); Brandon S. Cross, Charlotte, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 251 days.

(21) Appl. No.: 11/742,836

(22) Filed: May 1, 2007

(65) Prior Publication Data

US 2008/0223179 A1    Sep. 18, 2008

Related U.S. Application Data

(60) Provisional application No. 60/894,769, filed on Mar. 14, 2007.

(51) Int. Cl.
B25B 13/46   (2006.01)
B25B 13/18   (2006.01)

(52) U.S. Cl. .......................................... 81/63.1; 81/128
(58) Field of Classification Search .................. 81/63.1, 81/74, 60, 119, 124.3, 128, 129, 58.4
See application file for complete search history.

(56) References Cited

U.S. PATENT DOCUMENTS

| | | | |
|---|---|---|---|
| 2,701,977 A | 2/1955 | Stone | |
| 3,572,188 A * | 3/1971 | Christian, Jr. | 81/57.46 |
| 4,065,987 A | 1/1978 | Rager | |
| 4,752,163 A | 6/1988 | Fedor | |
| 4,799,832 A | 1/1989 | Abbott | |
| 5,069,091 A | 12/1991 | Bramsiepe et al. | |
| 5,299,895 A | 4/1994 | Greenhill | |
| 5,481,947 A | 1/1996 | Banns | |
| D385,172 S | 10/1997 | Bramsiepe et al. | |
| 5,765,669 A * | 6/1998 | Adams et al. | 192/44 |
| D419,298 S | 1/2000 | Bramsiepe et al. | |
| 6,050,165 A * | 4/2000 | Hall | 81/63.1 |
| 6,058,812 A | 5/2000 | Casel et al. | |
| 6,186,785 B1 * | 2/2001 | Rogers et al. | 433/141 |
| 6,216,563 B1 | 4/2001 | Hsieh | |
| 6,575,059 B2 * | 6/2003 | Liu | 81/60 |
| 6,641,145 B1 | 11/2003 | Nebe et al. | |
| 6,851,339 B2 | 2/2005 | Casel | |
| 6,857,339 B2 | 2/2005 | Chen | |
| 7,114,824 B2 * | 10/2006 | Picone | 362/119 |
| 7,124,664 B1 | 10/2006 | Lee | |
| 2003/0037642 A1 | 2/2003 | Liu | |

(Continued)

OTHER PUBLICATIONS

Irwin Industrial Tools, "Offset Handle Adjustable Tap & Reamer Wrenches," p. 1.

(Continued)

*Primary Examiner*—David B Thomas
(74) *Attorney, Agent, or Firm*—Deborah H. Spencer; Moore & Van Allen, PLLC

(57) ABSTRACT

A wrench comprises a handle connected to a housing. A socket is rotatably supported in the housing for ratcheting movement relative to the housing. A retaining member releasably secures a device in the socket. A retainer is supported on the housing and is movable between a first position and a second position. The retainer, when in the first position, at least partially overlays the socket. A plurality of guides orient a member relative to the socket. The guides are mounted in a rotatable body. A first handle is permanently connected to the housing and a second handle is removably connected to the housing.

35 Claims, 26 Drawing Sheets

OTHER PUBLICATIONS

Irwin Industrial Tools, "Adjustable Guide Die Stock Handles," pp. 1-2.

Irwin Industrial Tools, "Plain Die Stock Handles," pp. 1-2.

Gearwrench, "Ratcheting Tap and Die," pp. 1-2.

* cited by examiner

US 7,793,569 B2

WRENCH

CROSS-REFERENCES TO RELATED APPLICATIONS

This application claims priority under 35 U.S.C. 119(e) from provisional patent application Ser. No. 60/894,769, filed Mar. 14, 2007, by the inventors hereof, the entire disclosure of which is incorporated herein by reference.

BACKGROUND OF THE INVENTION

The invention relates generally to wrenches and, more particularly, to an improved ratcheting wrench suitable for use as a die wrench.

It will be appreciated that many different types of wrenches are known including die wrenches and ratcheting wrenches. Die wrenches typically comprise a socket for receiving a threaded die. Threaded dies are known for cutting or repairing and cleaning threads in a stud. These devices may be used to cut threads into virgin unthreaded stock or may be used to clean out and repair damaged, dirty or rusted threads in a threaded stud. The socket of the die wrench typically includes a set screw that can be rotated into engagement with the die to retain the die in the socket. Handles extend from the socket and are offset from one another 180 degrees such that both handles may be gripped to apply a uniform turning force on the die and maintain the proper orientation of the die relative to the stud. The socket may ratchet relative to the handles.

Ratchet wrenches are known where a tool is ratcheted to a handle such that the wrench can tighten or loosen a fastener without removing the wrench from the fastener. Ratchet wrenches may be embodied in combination with a socket wrench where the sockets are removably attached to the ratchet handle. These types of wrenches make the operation of the wrench less cumbersome in certain applications because the wrench does not have to be removed from the fastener for multiple turns. A set of wrenches or sockets is typically required in order for the wrench to be used on different size fasteners.

SUMMARY OF THE INVENTION

A wrench comprises a handle connected to a housing. A socket is rotatably supported in the housing for ratcheting movement relative to the housing. A retaining member releasably secures a device in the socket.

A wrench comprises a handle connected to a housing. A socket is supported on the housing and is defined by a plurality of faces. The housing is dimensioned to receive a device. A retainer is supported on the housing and is movable between a first position and a second position. The retainer, when in the first position, at least partially overlays the socket.

A wrench comprises a handle connected to a housing. A socket is supported on the housing and is defined by a plurality of faces. The housing is dimensioned to receive a device. A plurality of guides orient a member relative to the socket. The guides are mounted in a rotatable body.

A wrench comprises a housing. A socket is supported on the housing and is defined by a plurality of faces. The housing is dimensioned to receive a device. A first handle is permanently connected to the housing and a second handle is removably connected to the housing.

DETAILED DESCRIPTION OF EMBODIMENTS OF THE INVENTION

Figure 1:
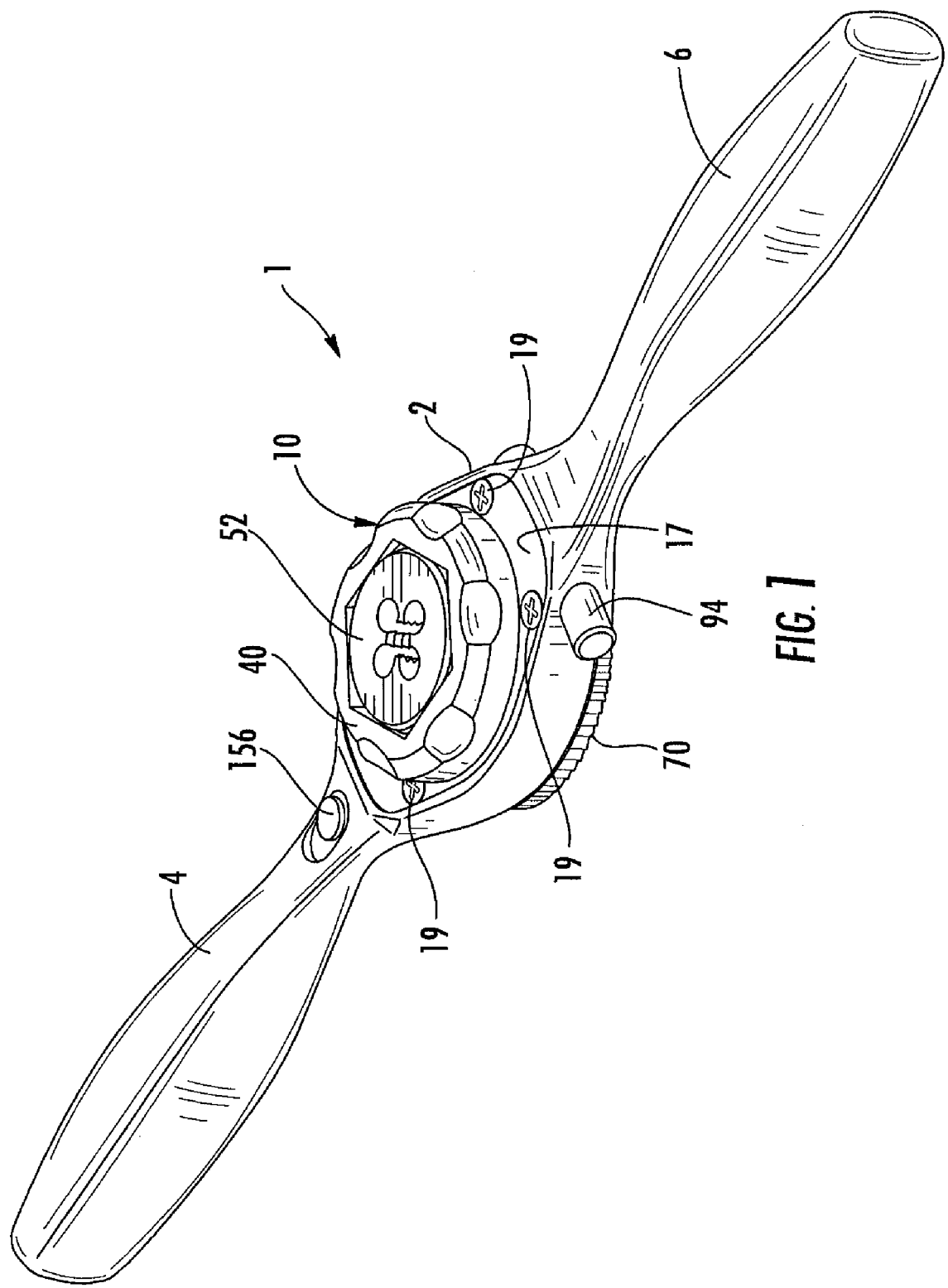
FIG. 1 is a perspective top view of one embodiment of the wrench of the invention.
Figure 2:
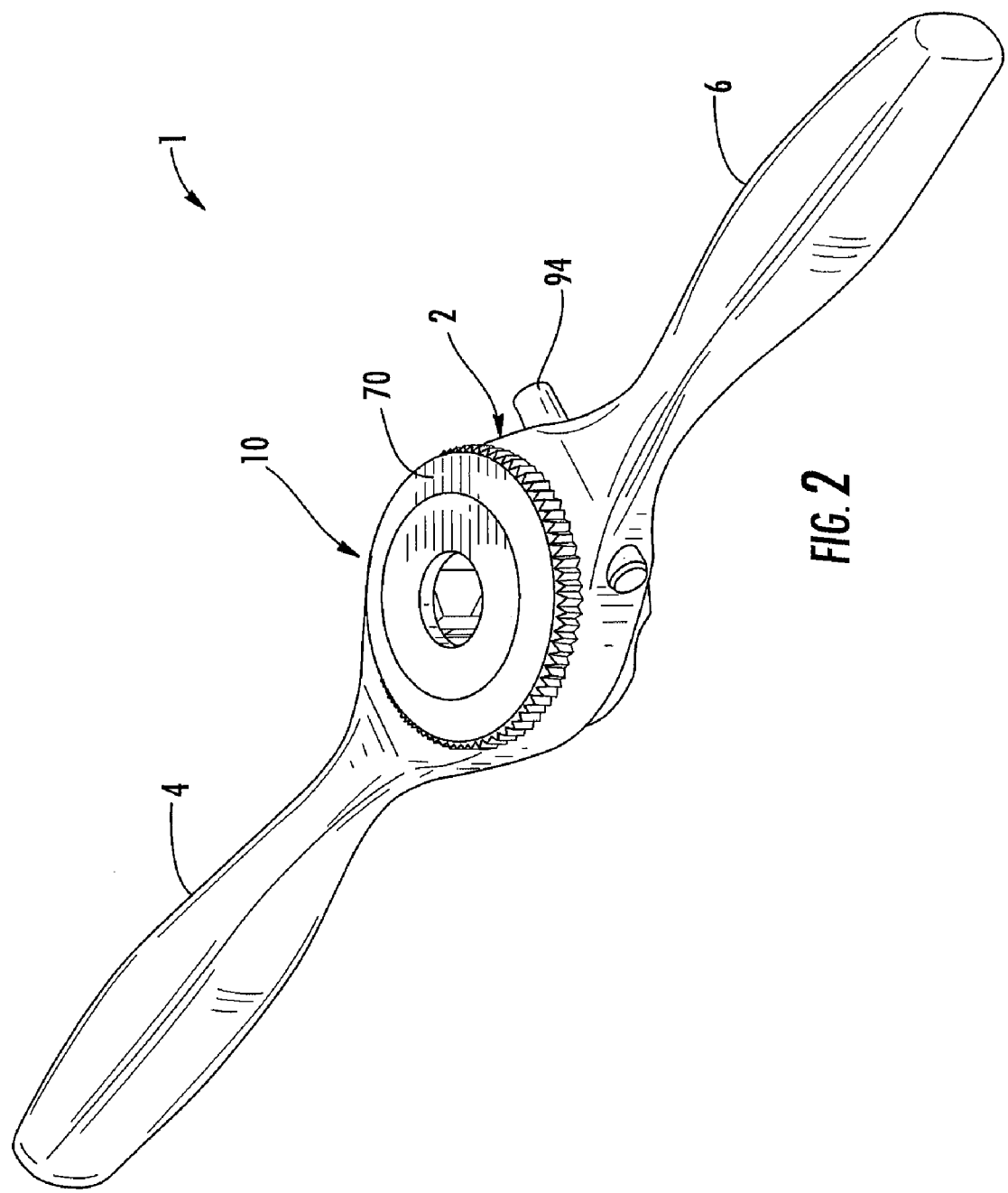
FIG. 2 is a perspective bottom view of the embodiment of FIG. 1 with a die positioned in the wrench.

An embodiment of the wrench of the invention is shown generally at 1 in the Figures and includes a wrench housing 2 connected to two handles 4 and 6. Handles 4 and 6 are offset from one another approximately 180 degrees such that the handles extend along the longitudinal axis of the wrench. Handle 4 may be made removable from the housing portion 2 as will hereinafter be described. The housing 2 defines a cavity 8 (FIG. 20) that extends through the housing portion and receives a wrench assembly 10.

Figure 3:
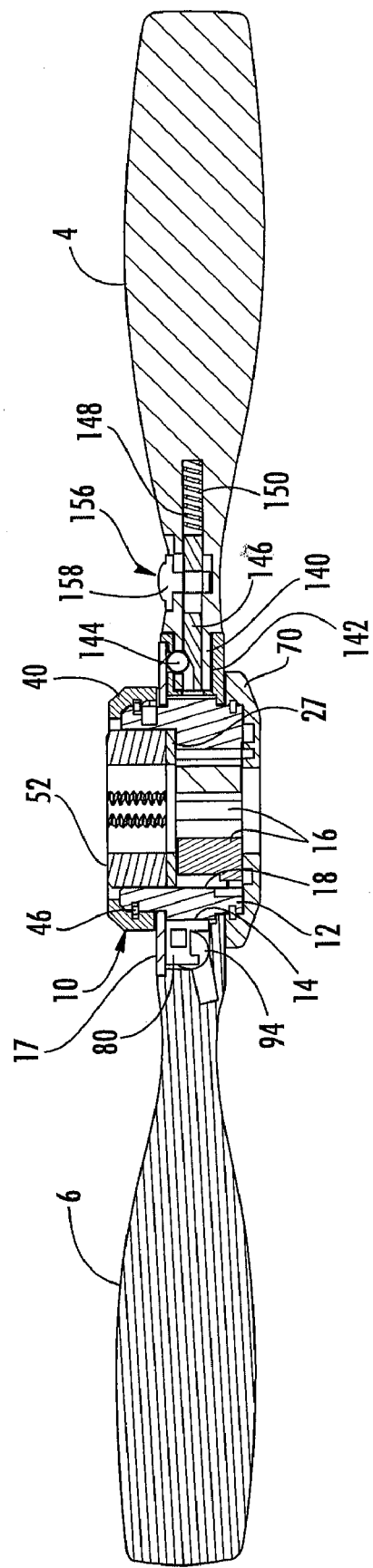
FIG. 3 is a longitudinal section view of the embodiment of FIG. 1.
Figure 4:
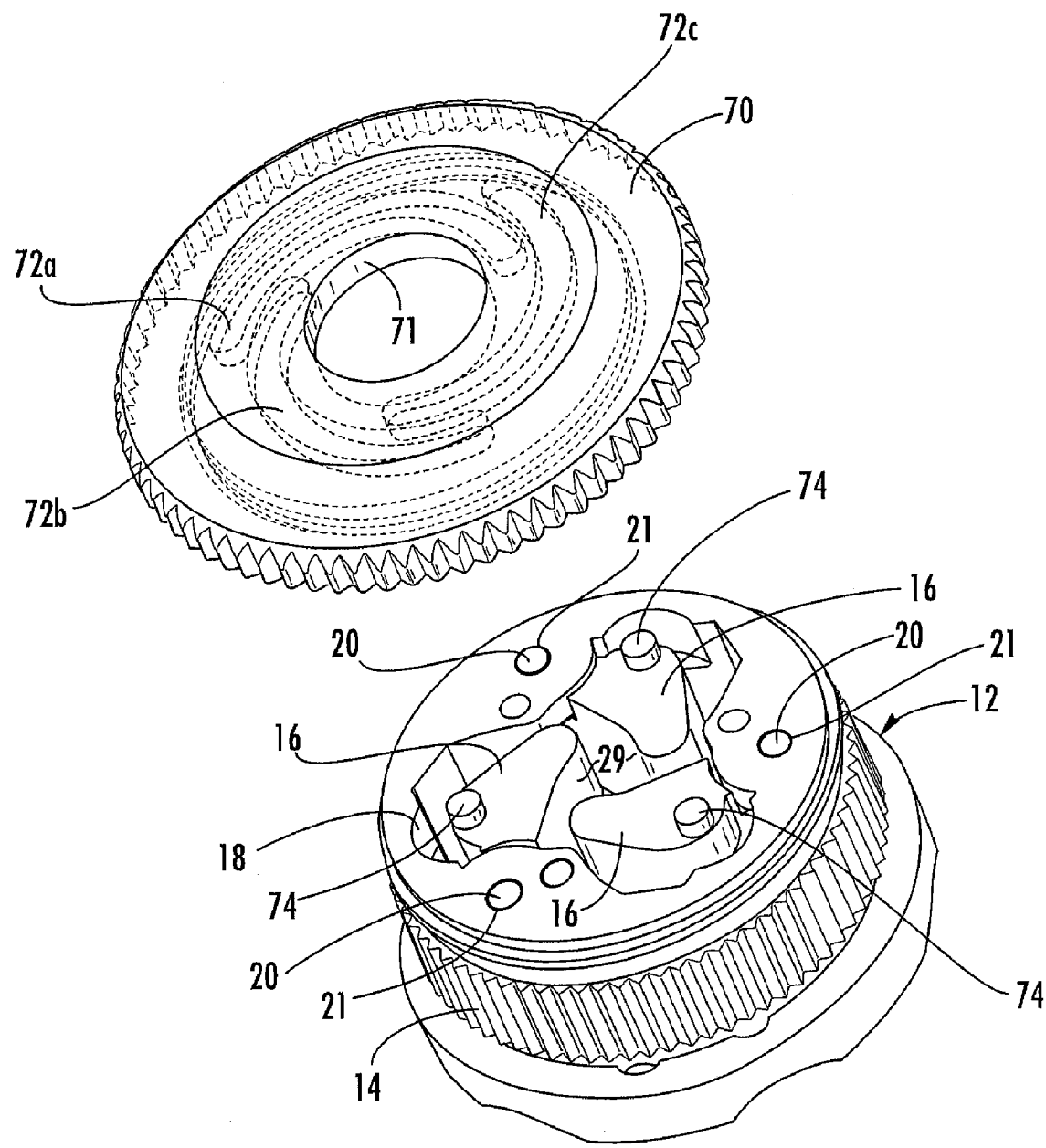
FIG. 4 is an exploded perspective bottom view of the wrench assembly of the embodiment of FIG. 1.
Figure 5:
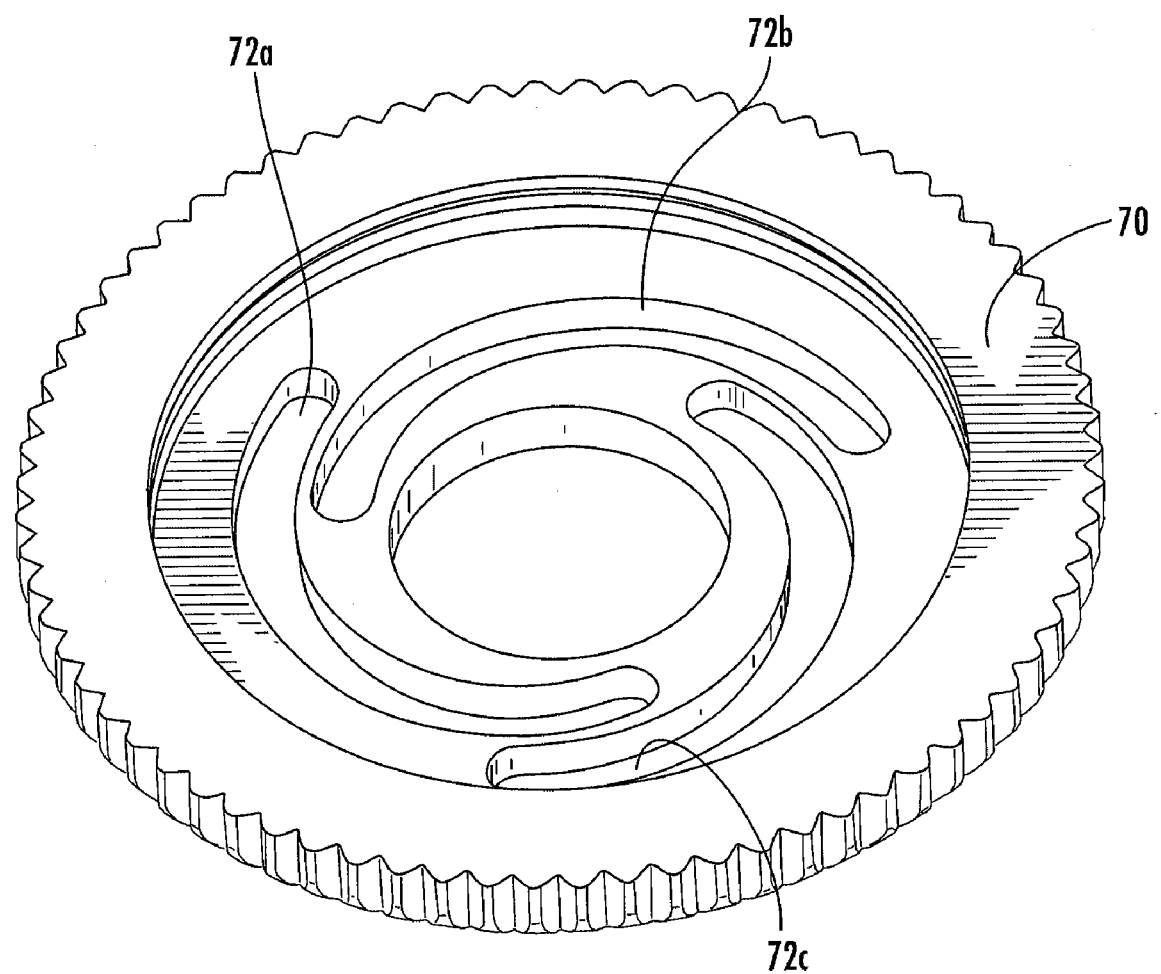
FIG. 5 is a perspective view of the cam plate shown in FIG. 4.
Figure 6:
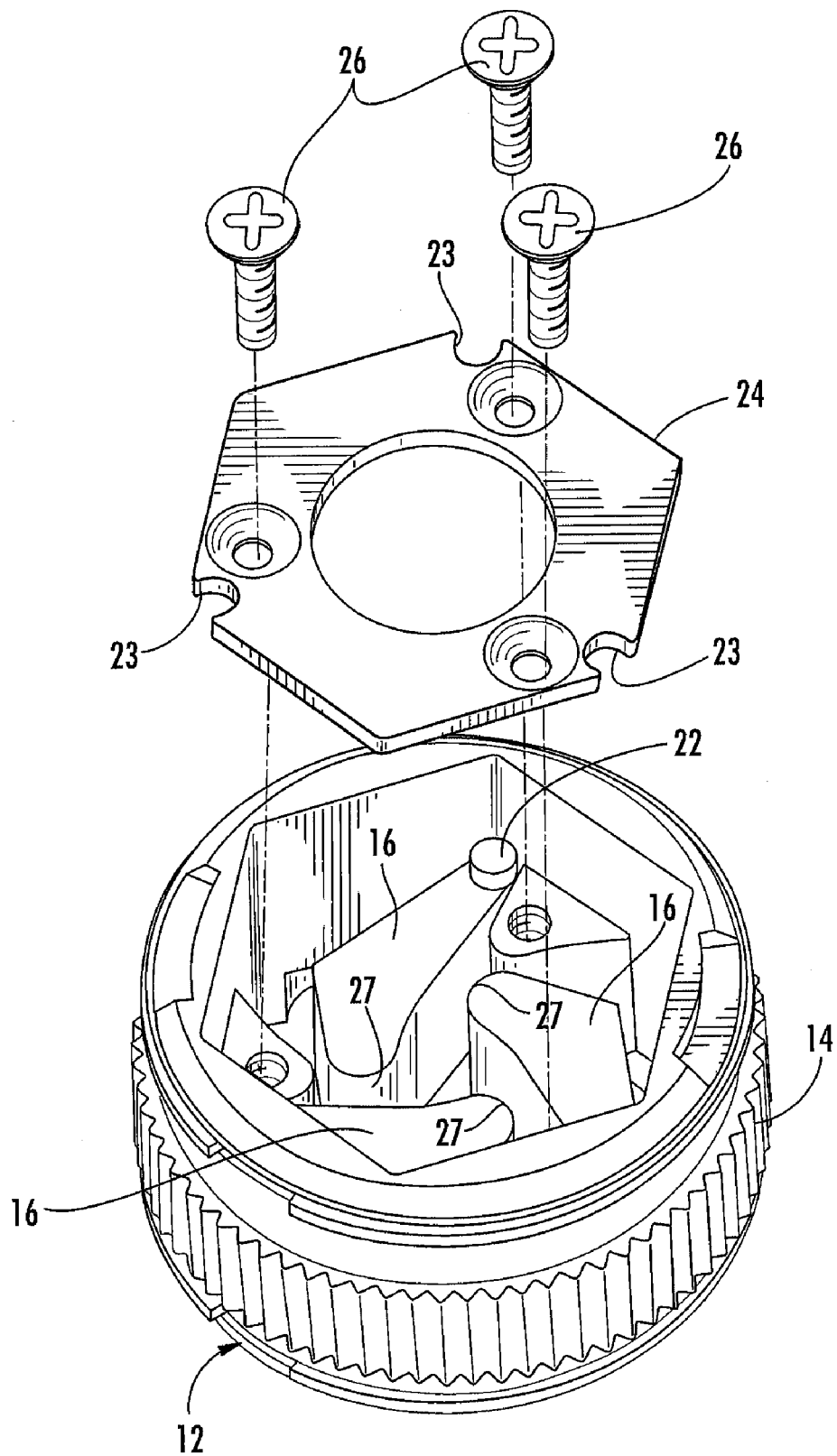
FIG. 6 is an exploded perspective top view of the wrench assembly of the embodiment of FIG. 1.
Figure 9:
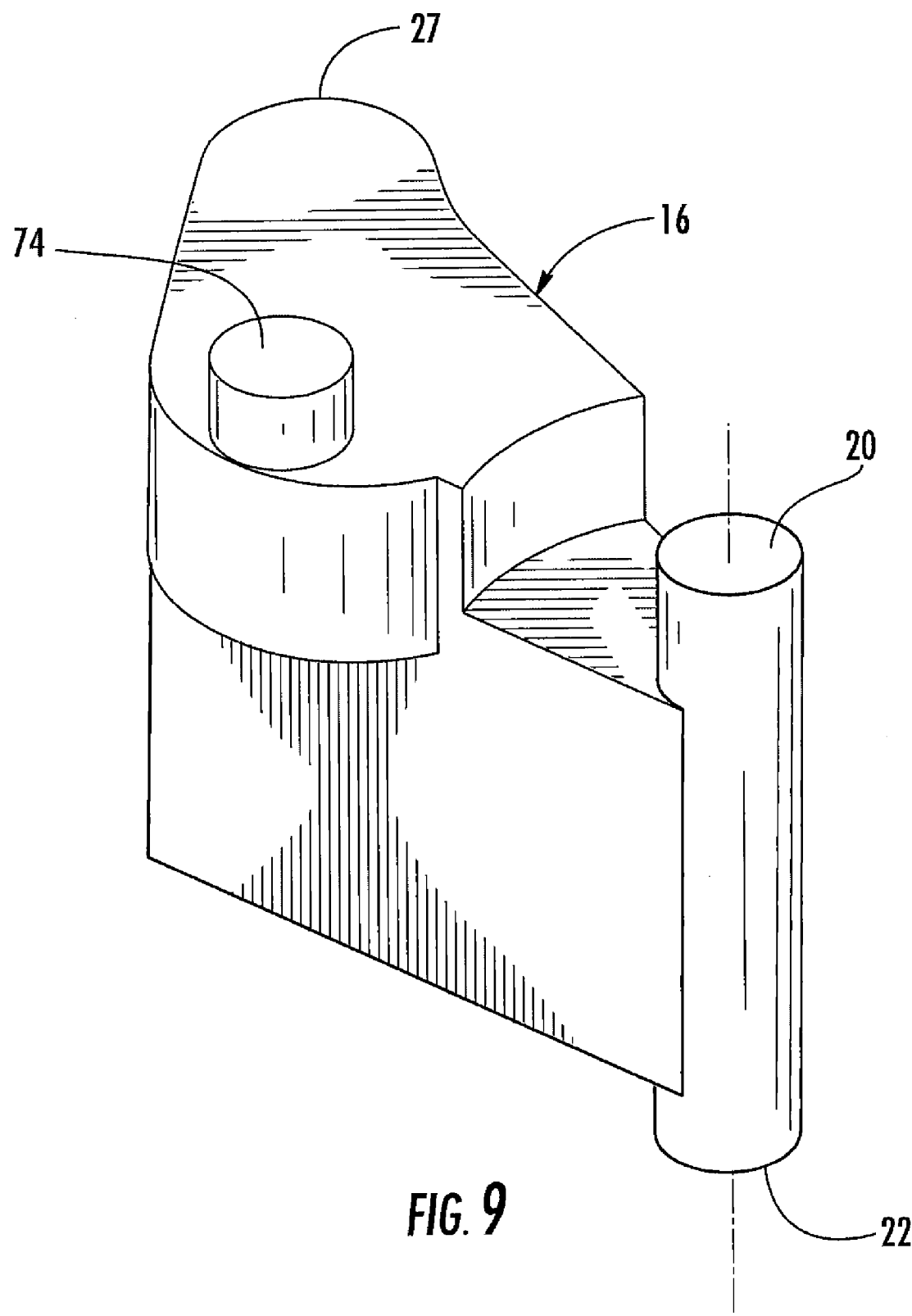
FIG. 9 is a perspective view of the alignment guide of the wrench assembly.

Referring to FIGS. 3 and 4, wrench assembly 10 comprises an annular body 12 having ratchet teeth 14 formed in a ring around the outer periphery thereof that are selectively engaged by pawls 80 and 82 to effectuate the ratcheting movement of the wrench as will hereinafter be described. A plurality of guides 16 are located in the interior cavity 18 of annular body 12. Each of the guides 16 include a pair of opposed pins 20 and 22 that form a hinge about which the guide pivots (FIG. 9). Pins 20 engage hole 21 formed in the annular body 12 (FIG. 4) while the other of the pins 22 are retained in recesses 23 formed in cover plate 24 (FIG. 6). Cover plate 24 may be secured to annular body 12 by any suitable fastening mechanism such as screws 26 to retain the guides 16 in the annular body 12. Each of the guides 16 include a distal end 27 that engages the stud on which the wrench is used to maintain the orientation of the wrench relative to the stud as will hereinafter be described.

Figure 7:
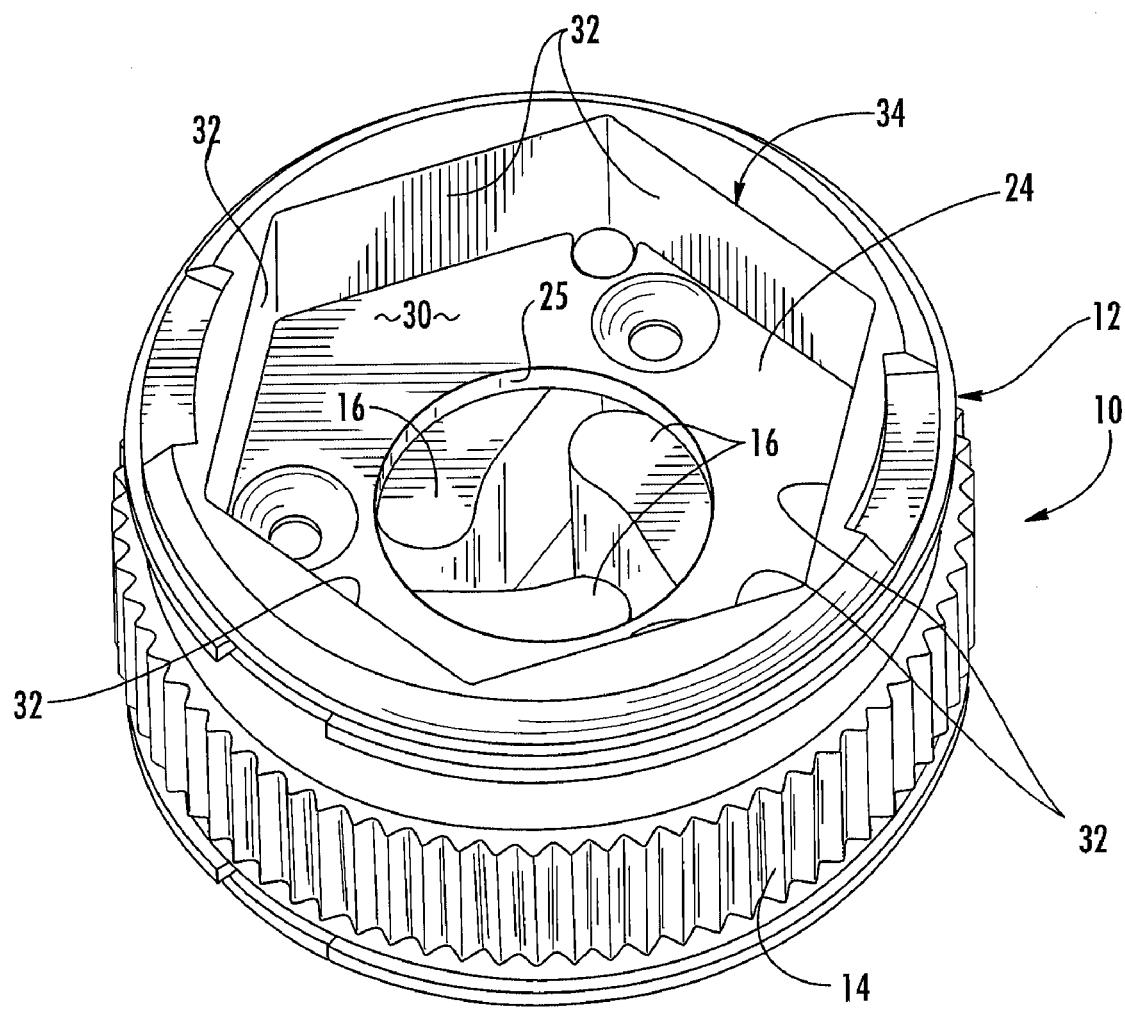
FIG. 7 is a perspective top view of the wrench assembly of the embodiment of FIG. 1.
Figure 8:
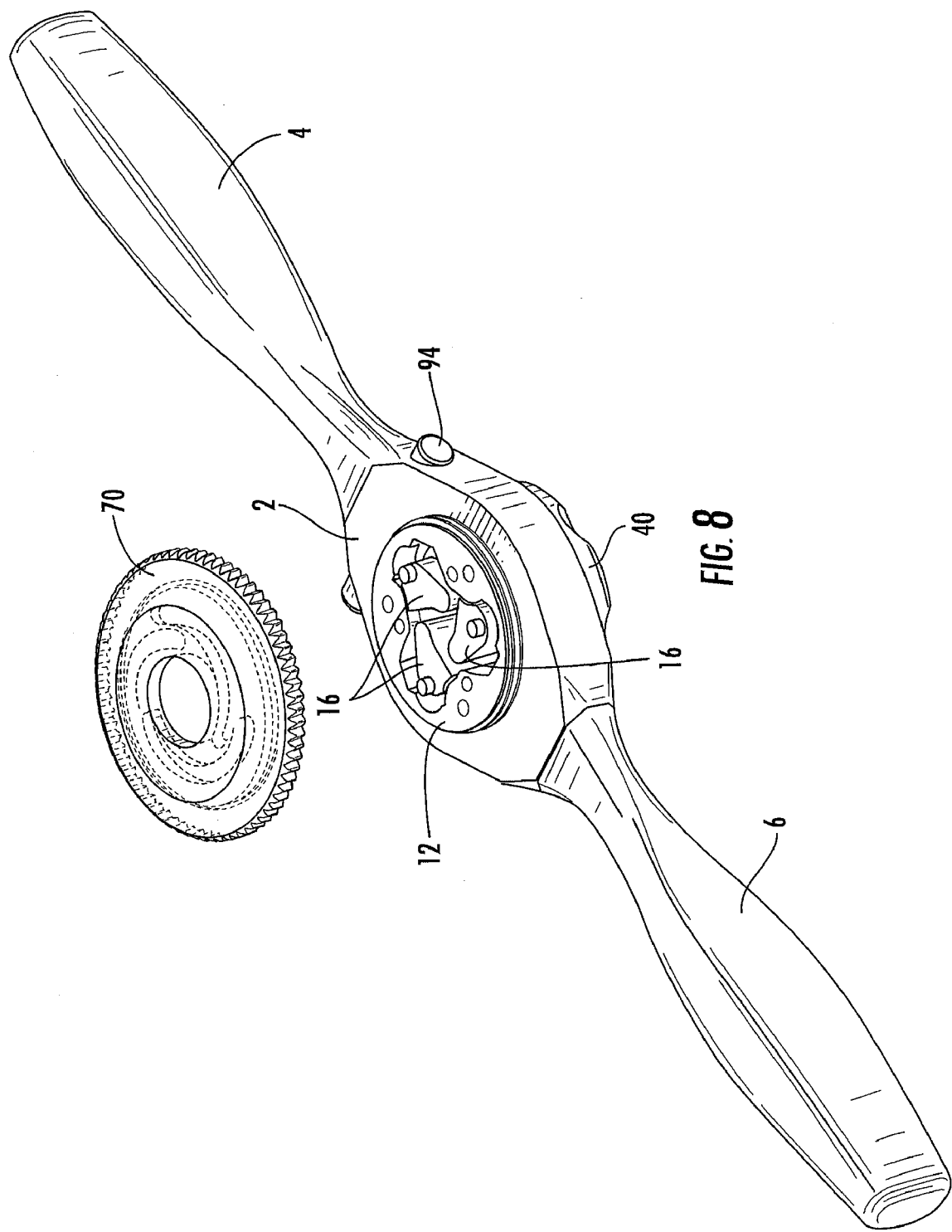
FIG. 8 is a partially exploded perspective bottom view of the wrench of FIG. 1.

Referring to FIG. 7, the cover plate 24 also serves to define a second interior cavity 30 in annular body 12 that is separated from cavity 18 by plate 24. The plate 24 includes a centrally located through hole 25 that communicates cavity 30 with cavity 18. The periphery of the second interior cavity 30 is defined by a plurality of flat faces 32 arranged to create a socket 34 that receives a die or other tool. The flat faces 32 engage the flat faces of the die or other tool such that the die or other tool is prevented from rotating relative to the annular body 12.

The wrench assembly 10 is located in cavity 8 such that the socket 34 is exposed on one side of the wrench (FIG. 10) and the guides 16 are disposed towards the opposite side of the wrench. The wrench assembly 10 is maintained in cavity 8 by plate 17 that is secured to housing 2 by fasteners 19 such as screws. Referring to FIGS. 3 and 10 through 14, a retainer in the form of a retaining ring 40 is located on the annular body 12 such that it extends around the periphery of body 12 and rotates relative to the body. The retaining ring 40 may be connected to the annular body 12 by a compression ring 46 that expands into annular recesses 42 and 44 formed on the body 12 and retaining ring 40, respectively. The retaining ring 40 is formed with an opening 48 that has a periphery defined by faces 48a that are substantially coextensive with the faces 32 of socket 34. The opening 48 is defined by a laterally extending flange 50 that extends toward the interior of the retaining ring to secure a die or other tool in the socket 34.

Figure 10:
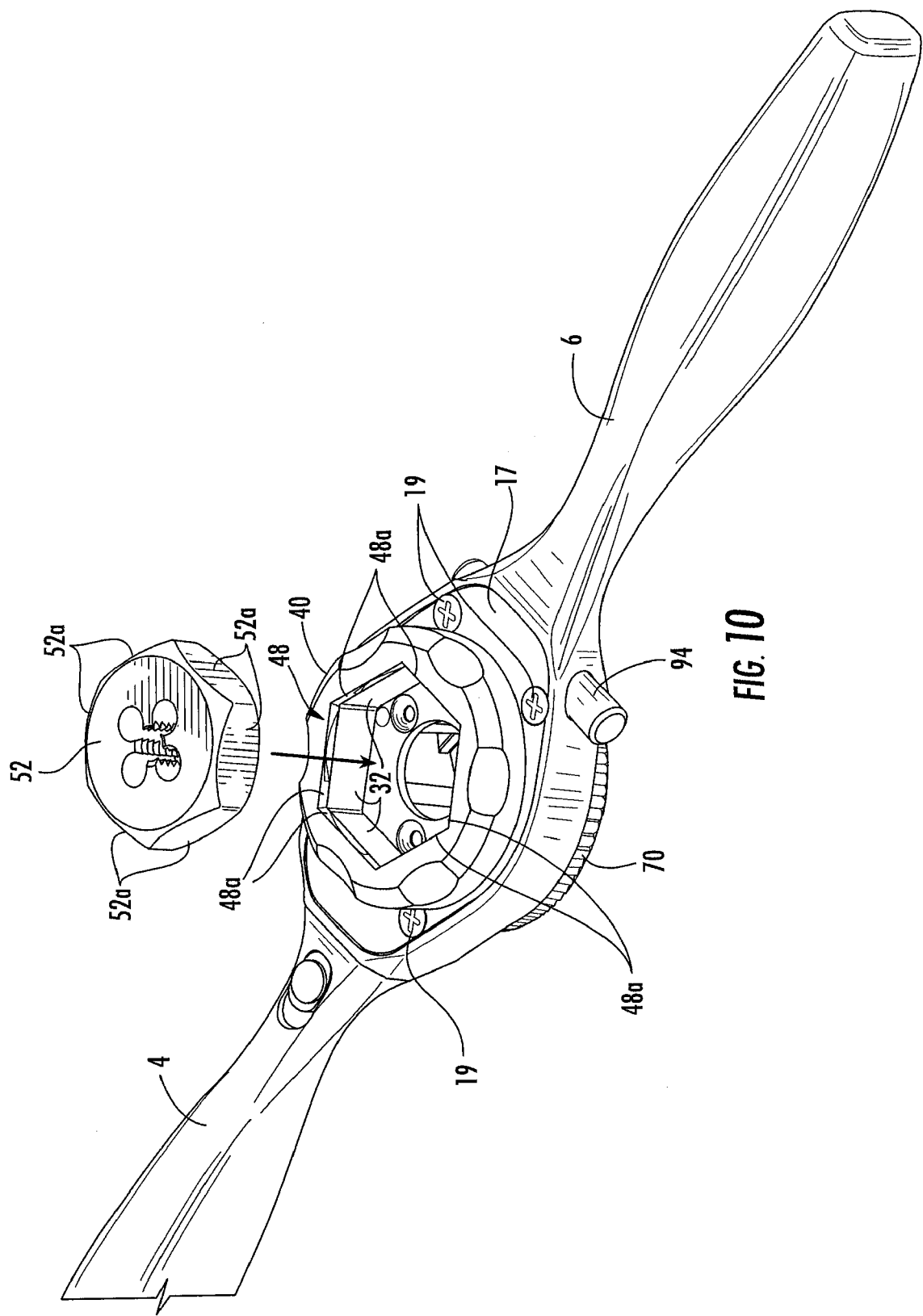
FIG. 10 is a perspective top view of the embodiment of FIG. 1 with the die removed from the wrench.
Figure 11:
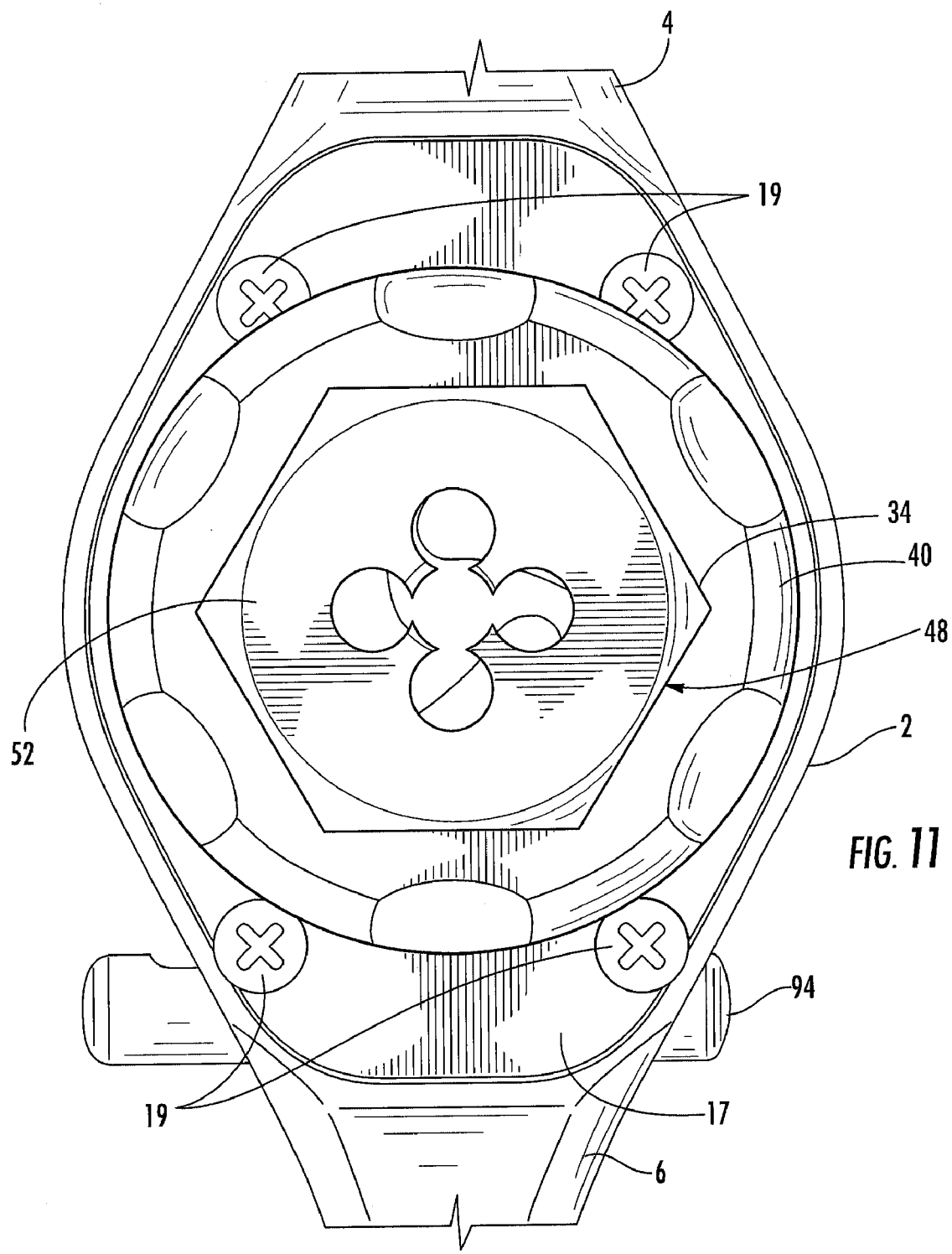
FIG. 11 is a plan view showing the die in the wrench in the unlocked position.
Figure 12:
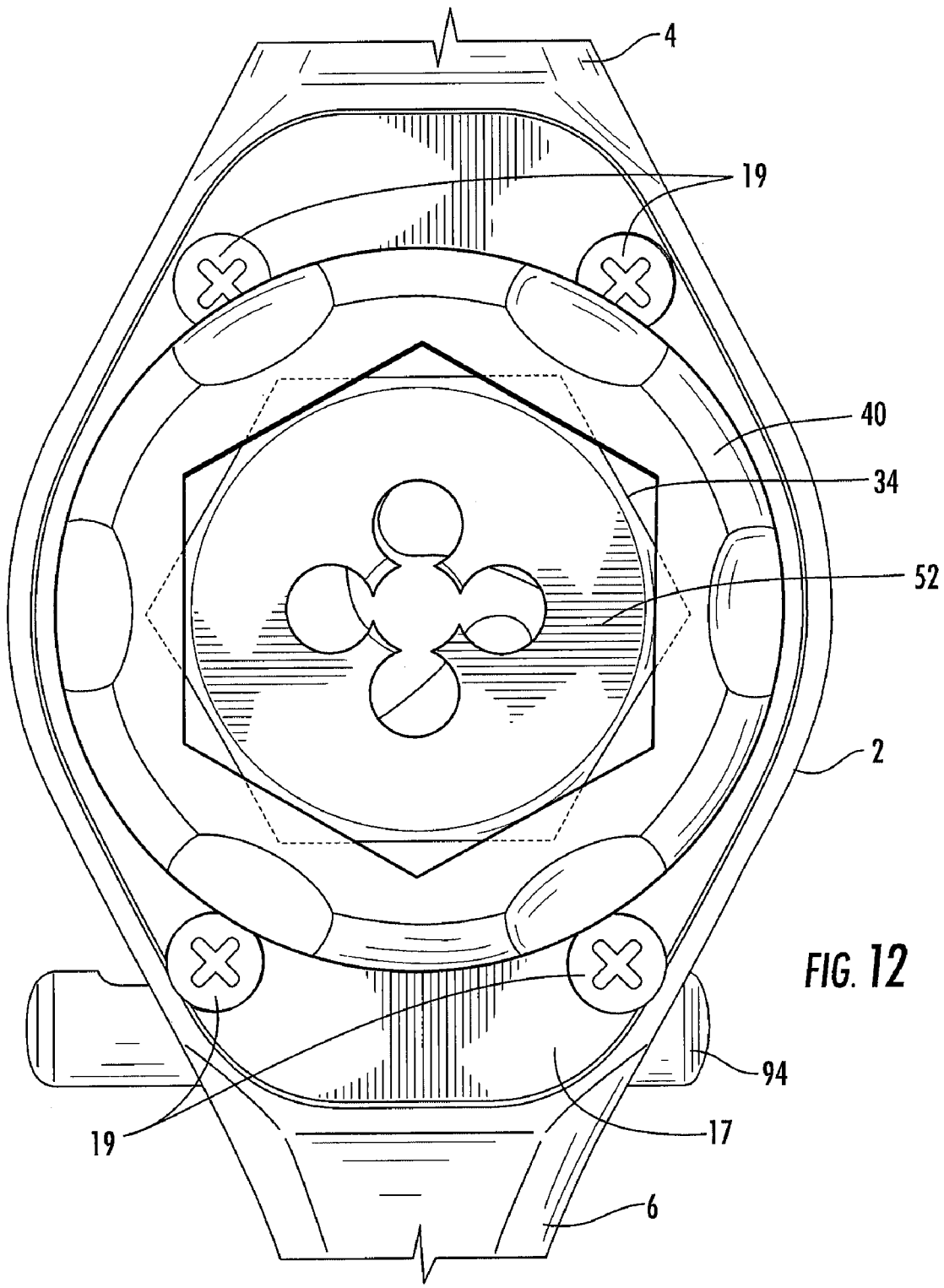
FIG. 12 is a plan view showing the die in the wrench in the locked position.
Figure 13:
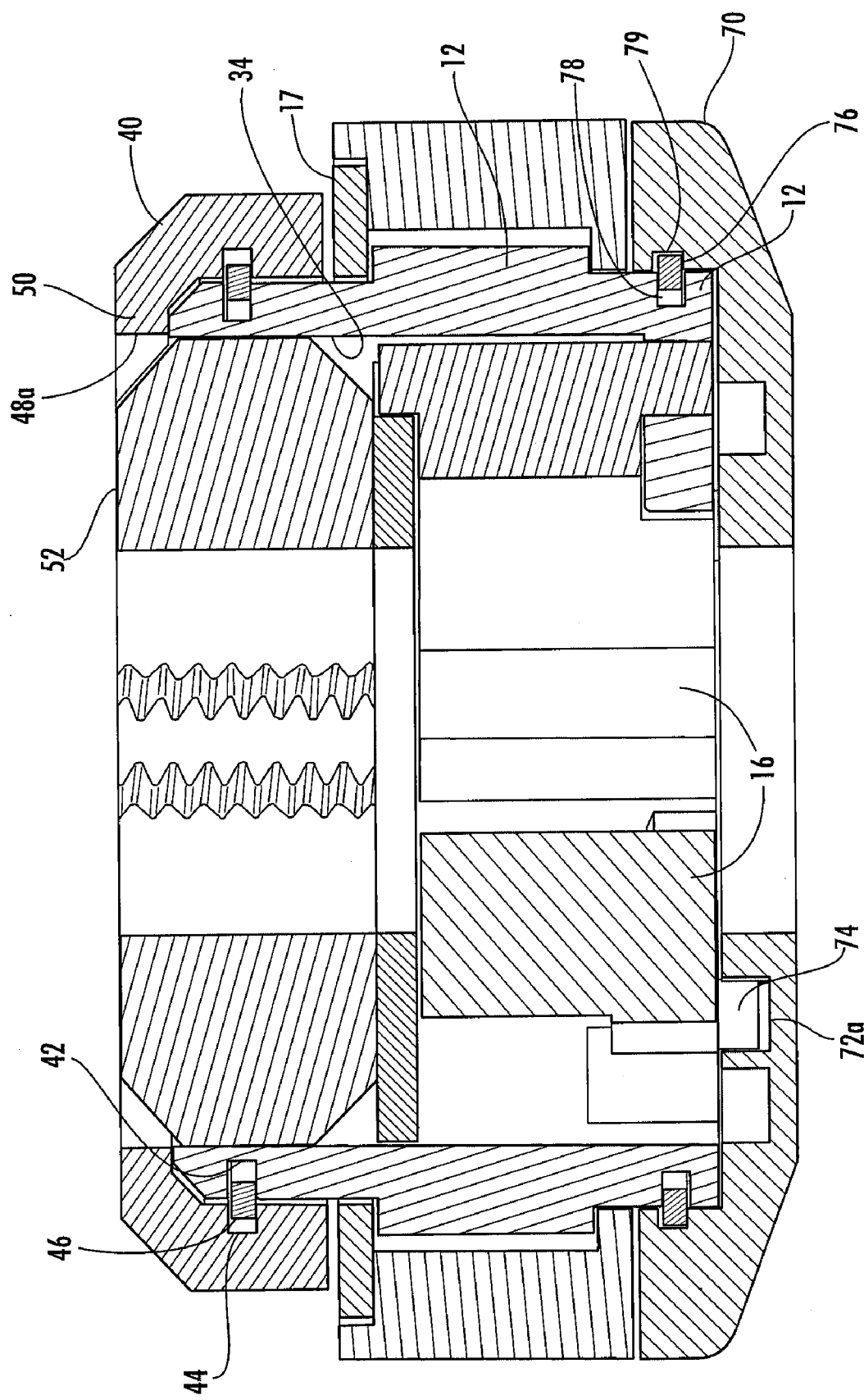
FIG. 13 is a section view showing the die in the wrench in the unlocked position.
Figure 14:
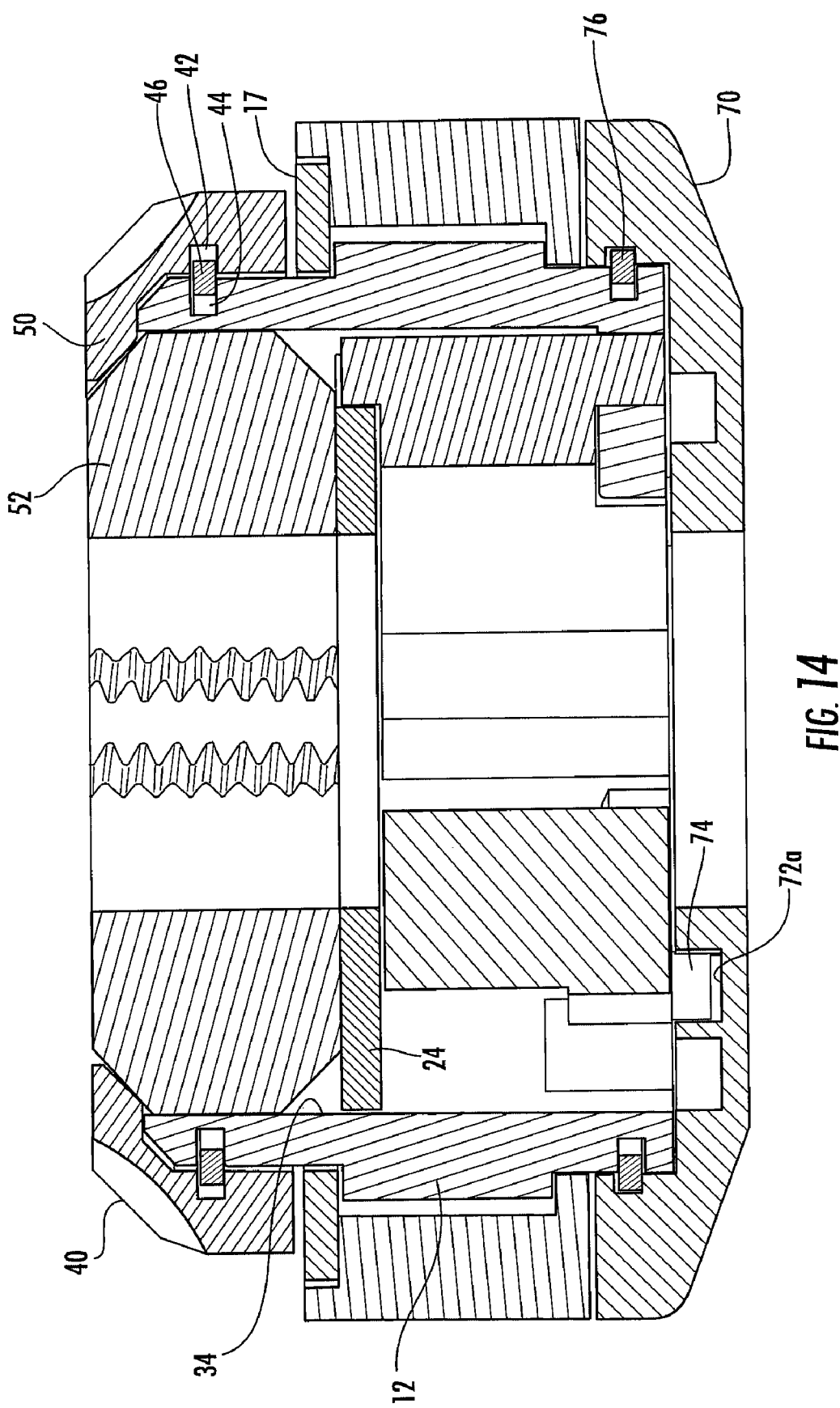
FIG. 14 is a section view showing the die in the wrench in the locked position.
Figure 15:
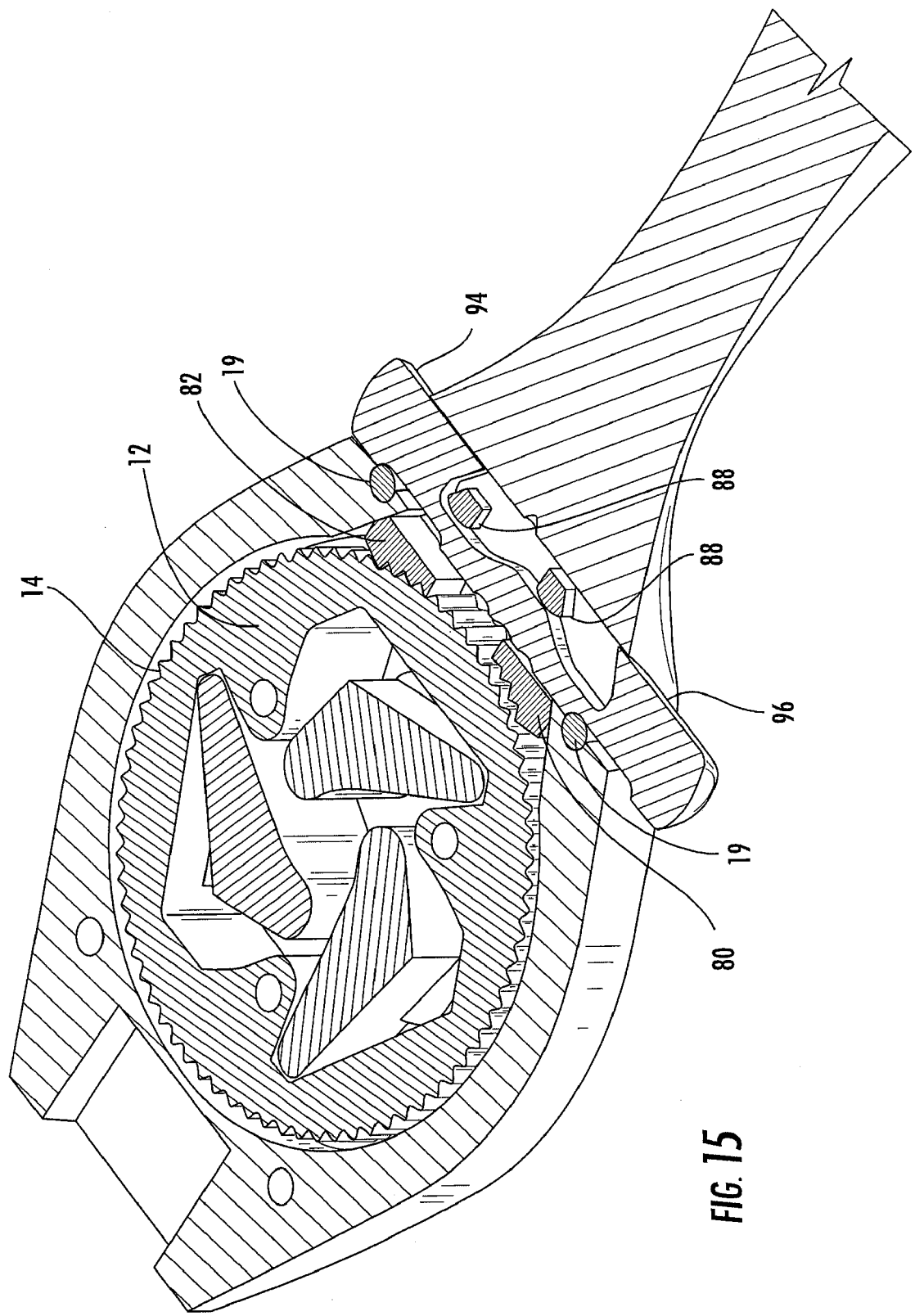
FIG. 15 is a perspective view showing the ratcheting mechanism of the wrench of FIG. 1.
Figure 16:
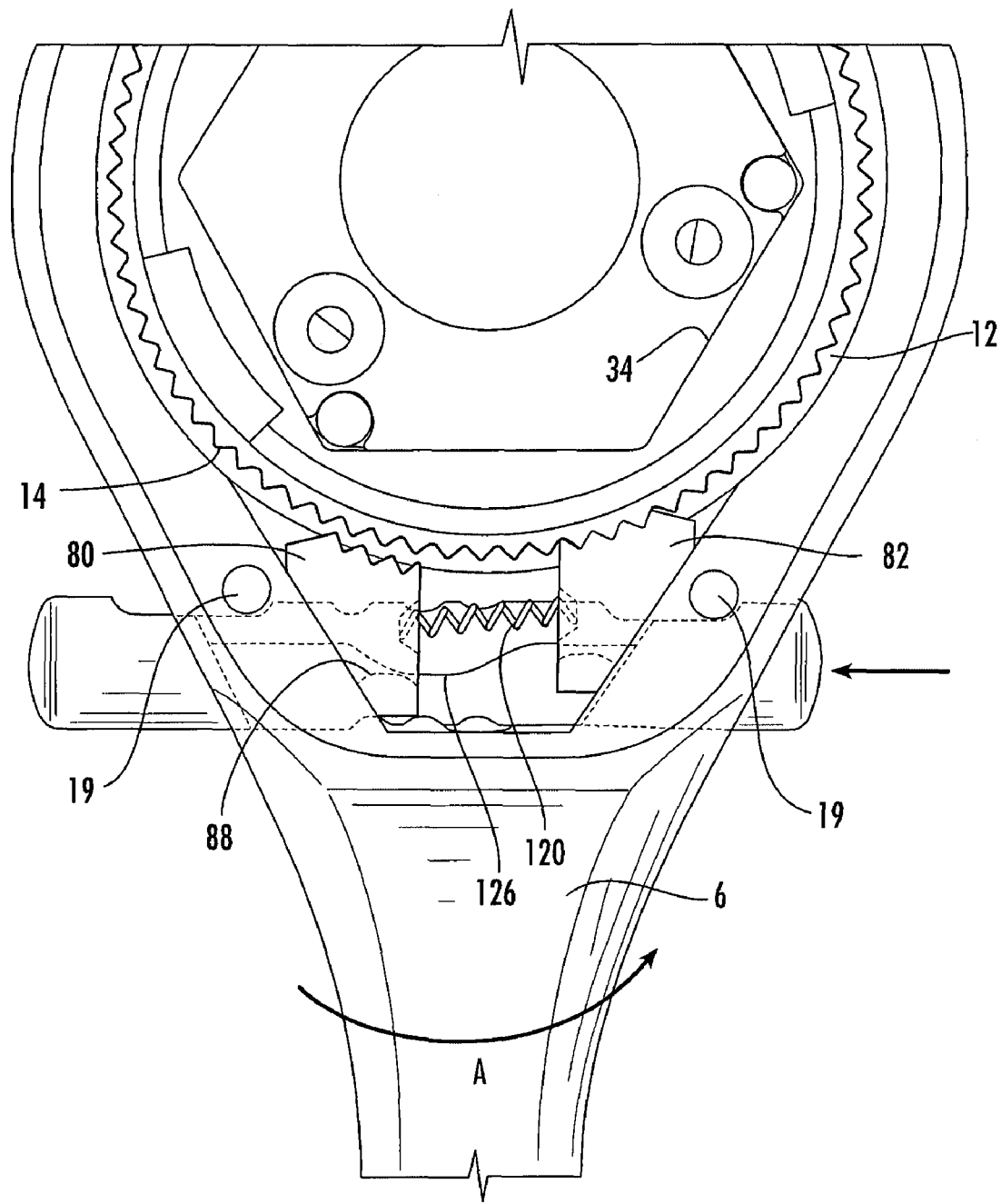
FIG. 16 is a plan view showing the ratcheting mechanism in a first ratcheting position.

Referring to FIGS. 11 through 14, the operation of the retaining ring 40 will be described. The retaining ring 40 is oriented such that the peripheral faces 48a of opening 48 are aligned with the faces 32 of socket 34 as shown in FIGS. 11 and 13. In this position the faces 32 of socket 34 and the faces 48a of retaining ring 40 are coextensive and define a receptacle for receiving a die or other tool as shown in FIGS. 10, 11 and 13. The die 52, or other tool, is inserted through the retaining ring 40 and into the socket 34 such that the flat faces 52a of the die are closely received by the flat faces 32 of socket 34. After the die 52, or other tool, is positioned in the socket 34 the retaining ring 40 is rotated relative to the body 12 to the position of FIGS. 12 and 14. In this position the faces 48a of retaining ring 48 are offset from the faces 32 of socket 34 such that the flange 50 of the retaining ring 40 extends over the corners of socket 34 and die 52 thereby preventing the die from being removed from the socket 34.

The alignment system will now be described with reference to FIGS. 3, 4, 5 and 13. The guides 16 are supported in the annular body 12 such that they can pivot about an axis extending through pins 20 and 22. The distal ends 27 of the guides 16 are disposed such that a centrally located space 29 is created between the distal ends 27. When the guides 16 are pivoted on pins 20 and 22, the distal ends 27 of the guides can move toward and away from one another to vary the space between the distal ends. When the wrench of the invention is used as a die wrench with a die to cut or clean threads on a stud, the guides 16 are used orient the die on the stud and maintain the angular relationship between the die and the stud as the wrench 1 is rotated. The guides may also be used to support other tools as will hereinafter be described. When a die is threaded onto a stud the stud will extend through the die 52, aperture 25 formed in plate 24, the space 29 between the guides 16 and aperture 71 formed in cam plate 70. The guides 16 may be pivoted to close onto the stud such that the guides prevent the wrench and die from becoming misaligned relative to the stud.

To pivot the guides 16 and move the distal ends 27 toward and away from one another a cam plate 70 is rotatably mounted on the annular body 12. The cam plate 70 includes a plurality of spiral tracks 72a, 72b and 72c, one track corresponding to each of the guides 16. The tracks 72a, 72b and 72c may comprise grooves formed in the inner surface of the cam plate 70. Each guide 16 includes a pin 74 that is spaced from the axis of rotation of the guide and that extends from the guide toward the cam plate 70. Each pin 74 is received in one of the slotted tracks 72a, 72b and 72c such that as the cam plate 70 rotates relative to the annular body 12 the tracks 72a, 72b and 72c force the distal ends 27 of the guides 16 toward and away from one another. The cam plate 70 may be retained on the annular body 12 using a compression ring 76 that engages annular slots 78 and 79 formed on the annular body 12 and cam plate 70, respectively, that allow the cam plate to rotate relative to the annular body but prevent the cam plate from becoming separated from the body (FIG. 13).

Figure 20:
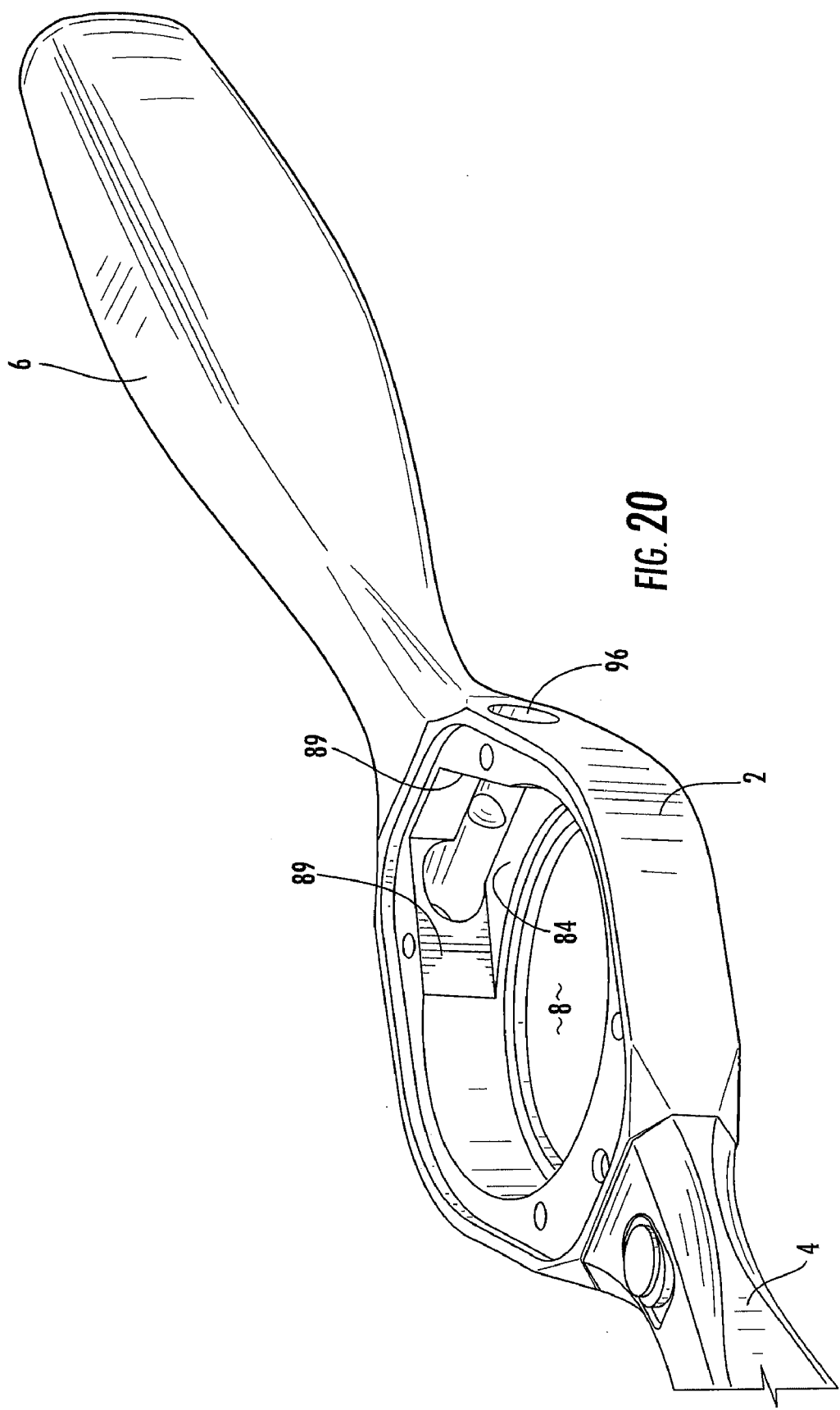
FIG. 20 is a perspective view showing the wrench with the wrench assembly removed.
Figure 21:
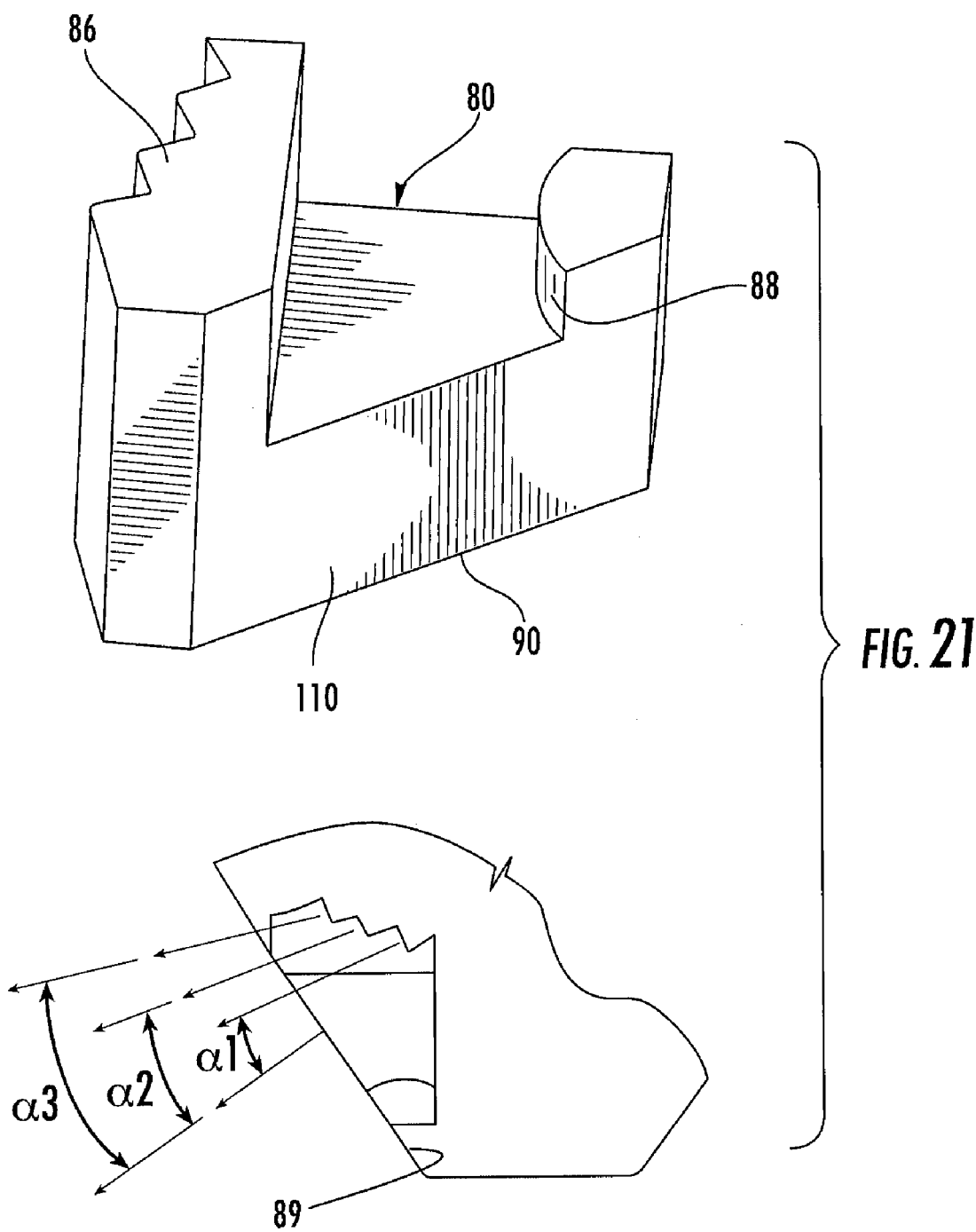
FIG. 21 is a perspective view of a pawl of the ratcheting mechanism.

The ratcheting mechanism will be described with reference to FIGS. 15 through 22. The ratcheting mechanism includes a first pawl 80 and a second pawl 82 located in a recessed area 84 of housing 12 adjacent the cavity 8 (FIG. 20). The assembly is configured such that pawls 80 and 82 are positioned adjacent to the ratchet teeth 14 formed on the annular body 12. Pawl 80 is configured as shown in FIG. 21 and includes a plurality teeth 86 formed on pawl body 90 and dimensioned to engage the teeth 14 formed on the annular body 12. Pawl 80 includes a cam surface 88 that extends from the cam body 90. Pawl 82 is a mirror image of pawl 80. To ensure that the pawls lock tight with teeth 14 an angle $\alpha$ is provided between the tooth force and the pawl side normal force where $\alpha_1$, $\alpha_2$, and $\alpha_3$ are all greater than 0.

A rod 94 is inserted in a bore 96 that extends transversely through the wrench housing where the bore 96 is open to recessed area 84. The rod 94, shown in detail in FIG. 22, includes a camming surface 98 formed such that the cam surfaces 88 on the pawls 80 and 82 extend into and contact the camming surface 98. The rod 94 is formed with end portions 102 and 104 that are connected too one another by a reduced thickness center portion 106. The camming surface 98 is formed on the side of center portion 106 opposite the annular body 12. The pawls 80 and 82 and rod 94 are positioned such that the central portion 106 is disposed over the pawl body 90 with the cam surfaces 88 extending into contact with the camming surface 98. The pawls are further arranged such that the angled lateral surface 110 of each pawl slides against the outer angled surface 89 of the recessed area 84. Screws 19, extending transversely across bore 96 to engage faces 114 formed on the rod 94 to limit the travel of the rod 94 in the bore 96. Further, detents 116, 117 and 118 are provided on the rod 94 that are engaged by a spring loaded ball to temporarily fix the rod in one of three positions—a clockwise rotation position, a counterclockwise rotation position and a locked position. The spring loaded ball is positioned in bore 119 in recessed area 84 and is forced to an extended position by a compression spring located in bore 119.

A compression spring 120 is located between the pawls 80 and 82. Spring 120 is compressed between the pawls 80 and 82 such that the spring exerts a pressure tending to spread the pawls apart. The engagement of the angled surface 110 on the pawls 80 and 82 with the angled surfaces 89 of the recessed area 84 causes the pawls to slide along surfaces 89 and into engagement with the ratchet teeth 14 under the force exerted by spring 120.

Figure 22:
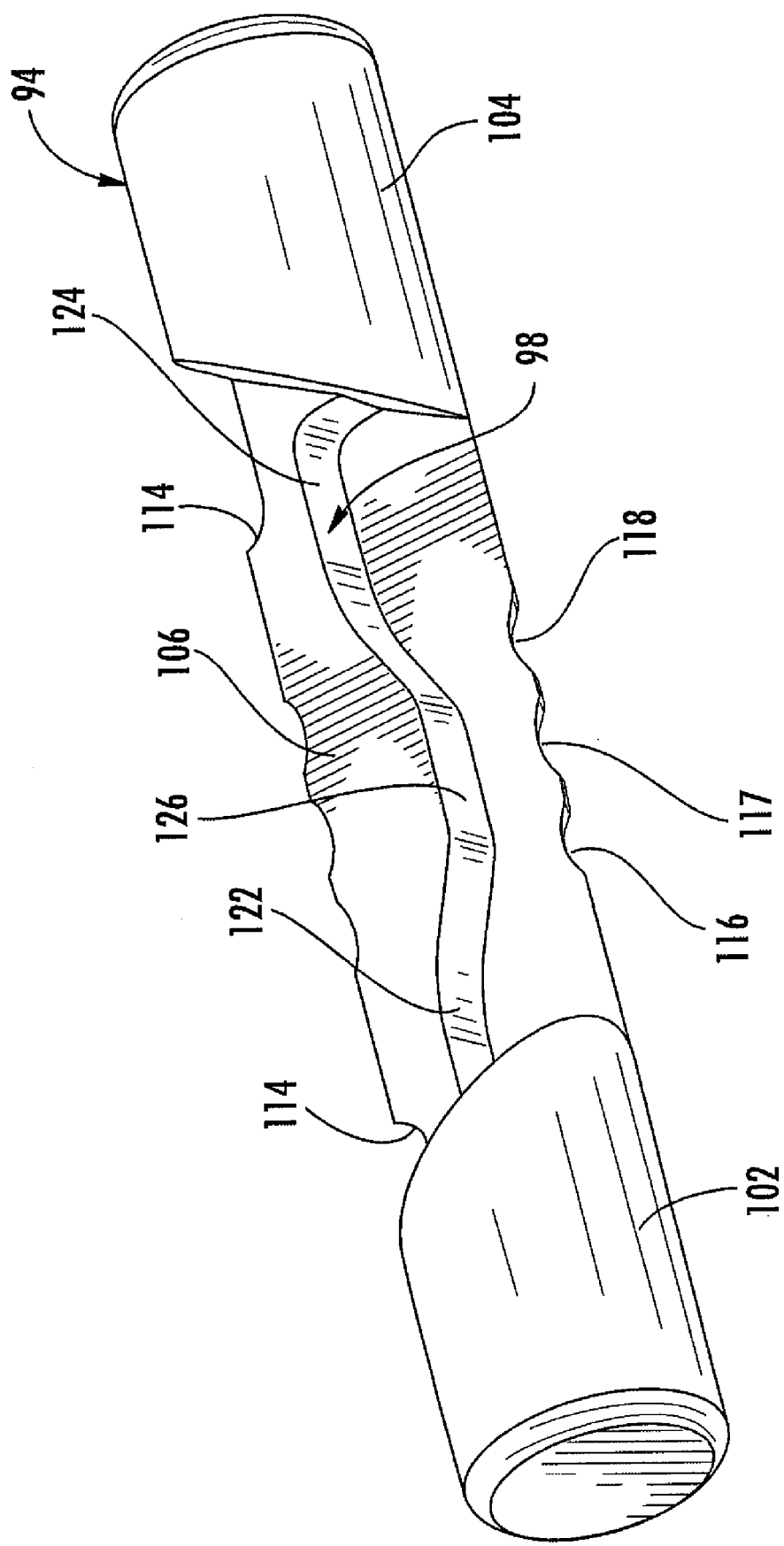
FIG. 22 is a perspective view of the cam rod of the ratcheting mechanism.

The camming surface 98 on the rod 94 is arranged such that it has three sections. The first section 122 and the third section 124 are set back relative to the middle section 126 as shown in FIG. 22. When the rod is in the first position shown in FIG. 16 middle section 126 of camming surface 98 engages the cam surface 88 on pawl 80 to overcome the force exerted by the spring 120 and force the pawl 80 away from the ratchet teeth 14. In this position the end section 126 of camming surface 98 does not contact the cam surface of pawl 82 such that spring 120 forces the pawl 82 into engagement with ratchet ring 14. In this position handles 4 and 6 are free to rotate relative to the body 12 and socket 34 as shown by arrow A but are locked in a direction opposite to arrow A.

Figure 17:
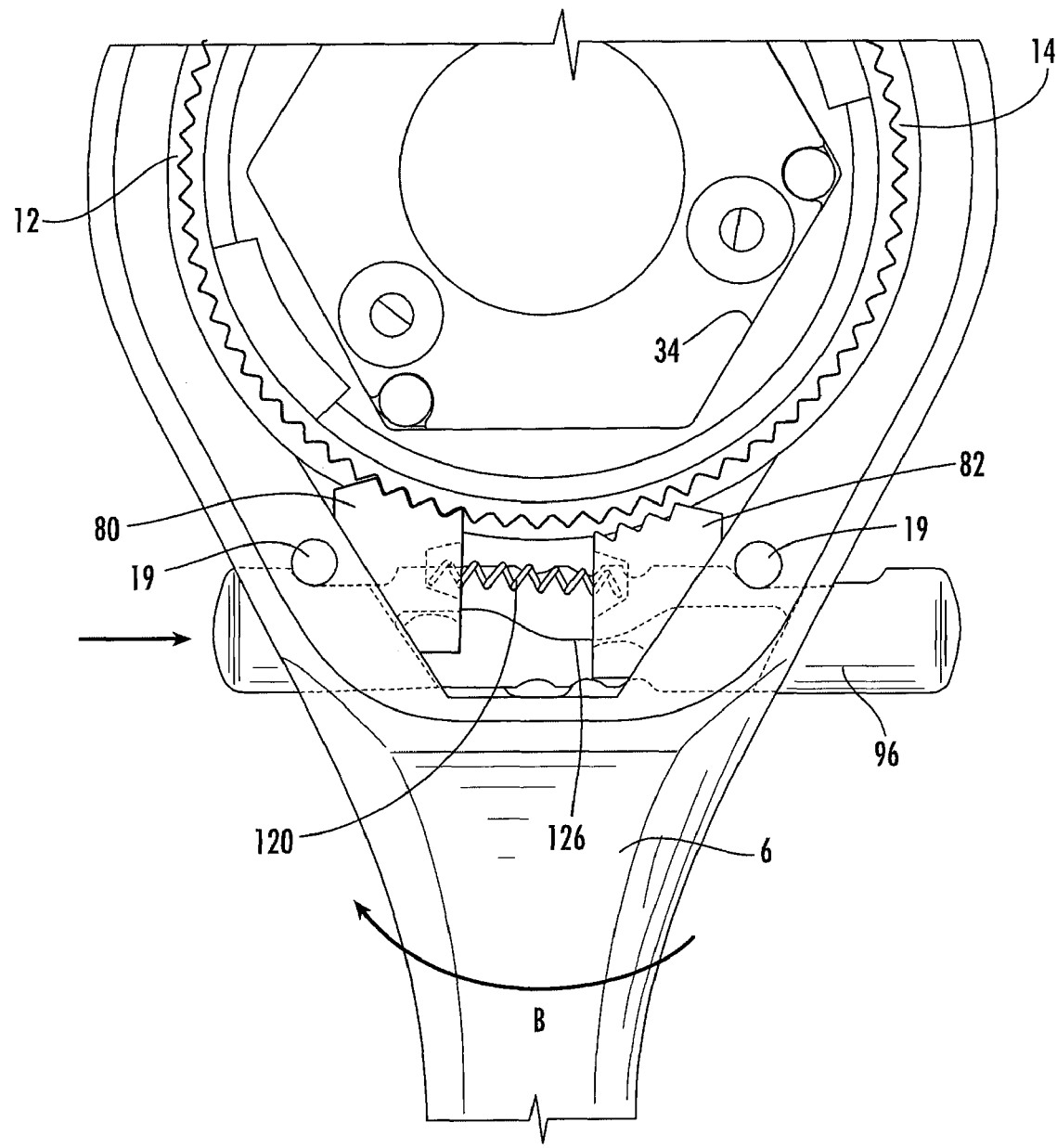
FIG. 17 is a plan view showing the ratcheting mechanism in a second ratcheting position.

When the rod is in the second position shown in FIG. 17 middle section 126 of camming surface 98 engages the cam surface 88 on pawl 82 to overcome the force exerted by the spring 120 and force the pawl 82 away from the ratchet teeth 14. In this position the end section 122 of camming surface 98 does not contact the cam surface of pawl such that spring 120 forces the teeth of pawl 80 into engagement with ratchet ring 14. In this position handles 4 and 6 are free to rotate relative to body 12 and socket 34 as shown by arrow B but are locked in a direction opposite to arrow B.

Figure 18:
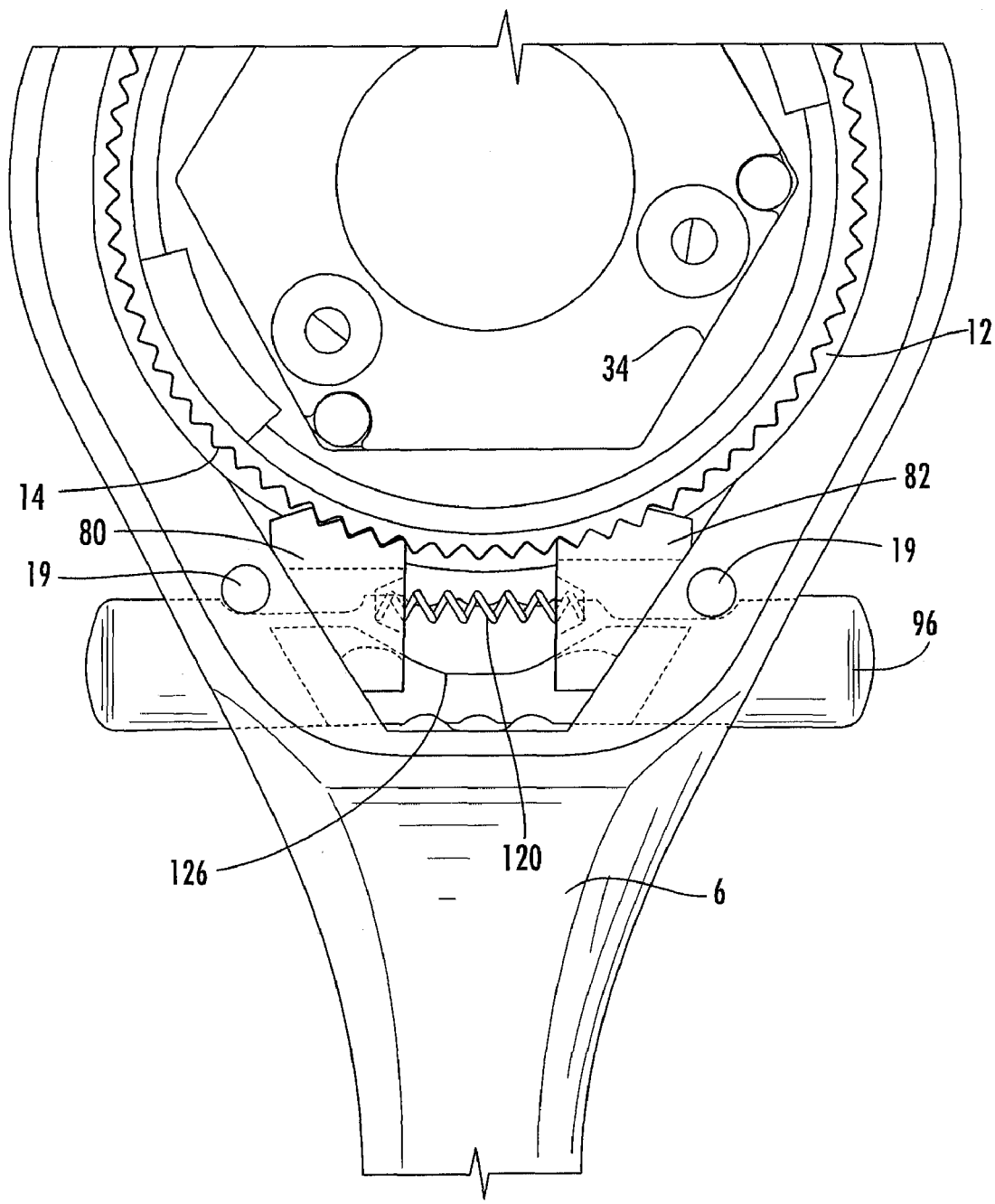
FIG. 18 is a plan view showing the ratcheting mechanism in a locked position.
Figure 19:
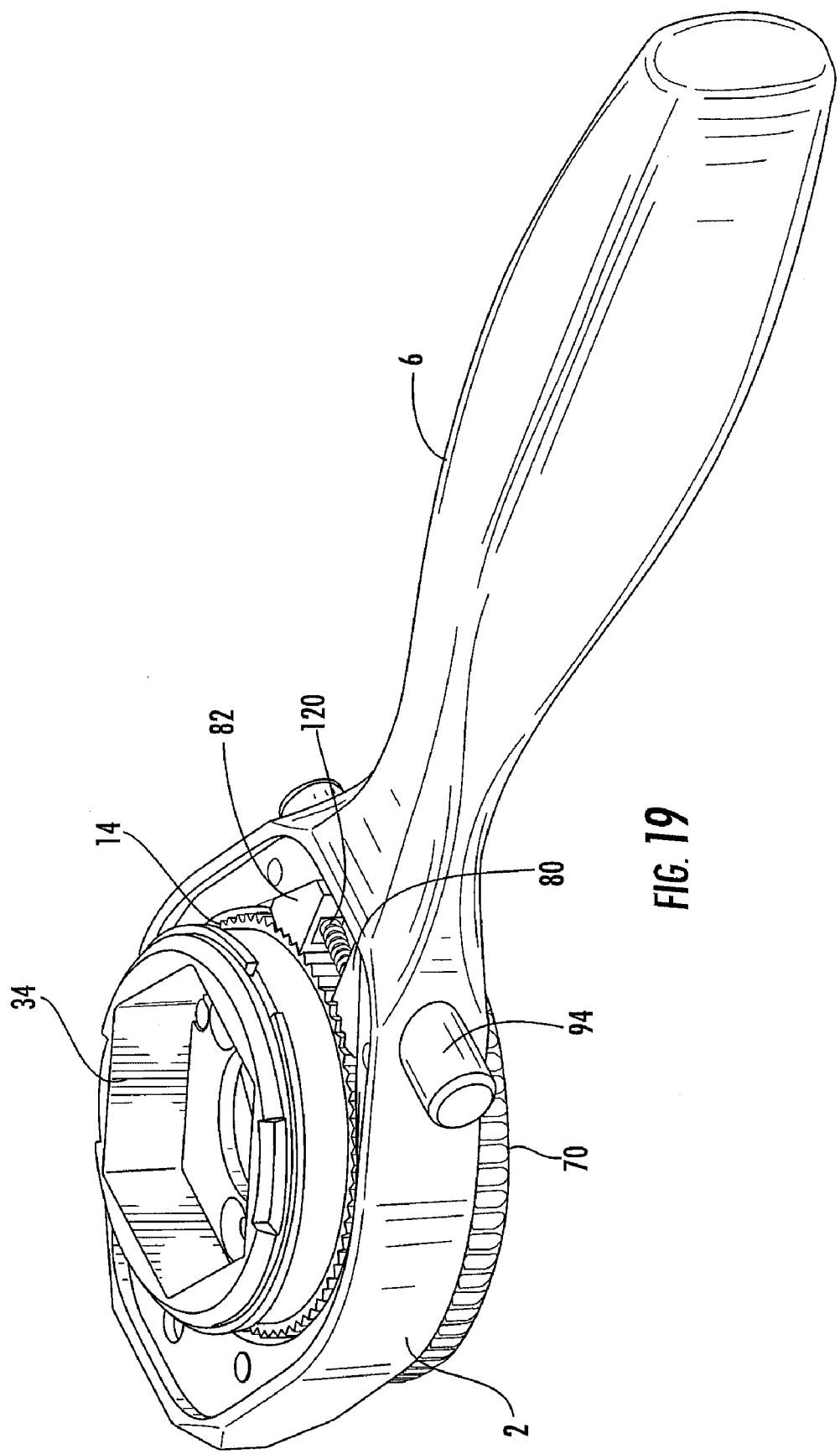
FIG. 19 is a perspective view of the ratcheting mechanism with the retainer removed.

When the rod 94 is in the third position shown in FIG. 18 middle section 126 of camming surface 98 does not engage either of the cam surfaces on either of the pawls 80 or 82. In this position, spring 120 forces both pawls 80 and 82 into engagement with ratchet ring 14. In this position the body 12 and socket 34 cannot rotate relative to the handles 4 and 6 in either direction and the wrench may be used without any ratcheting action.

Figure 23C:
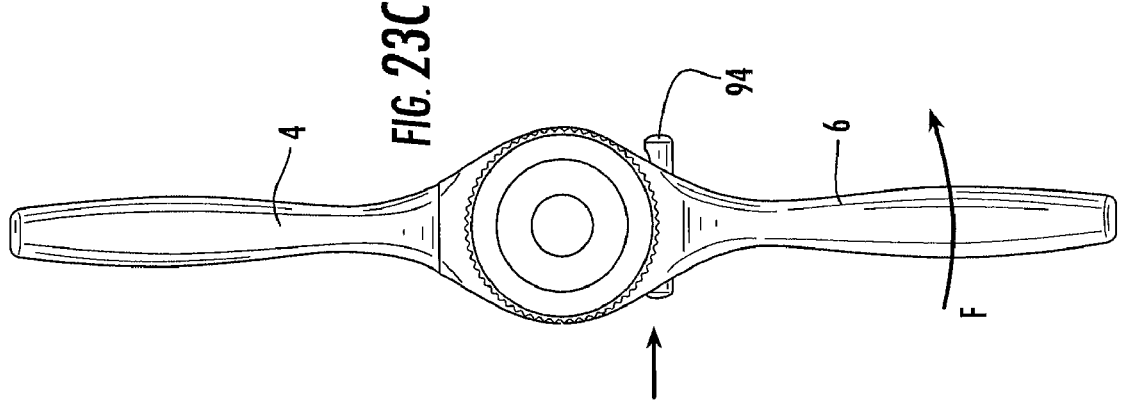
FIGS. 23A, 23B and 23C are plan views showing operation of the ratcheting mechanism of the invention.
Figure 23B:
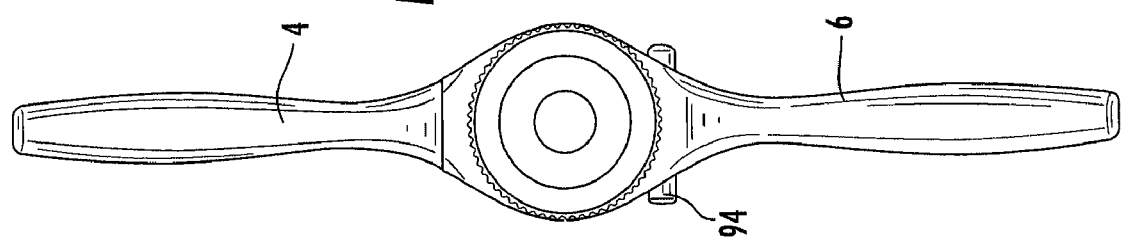
Figure 23A:
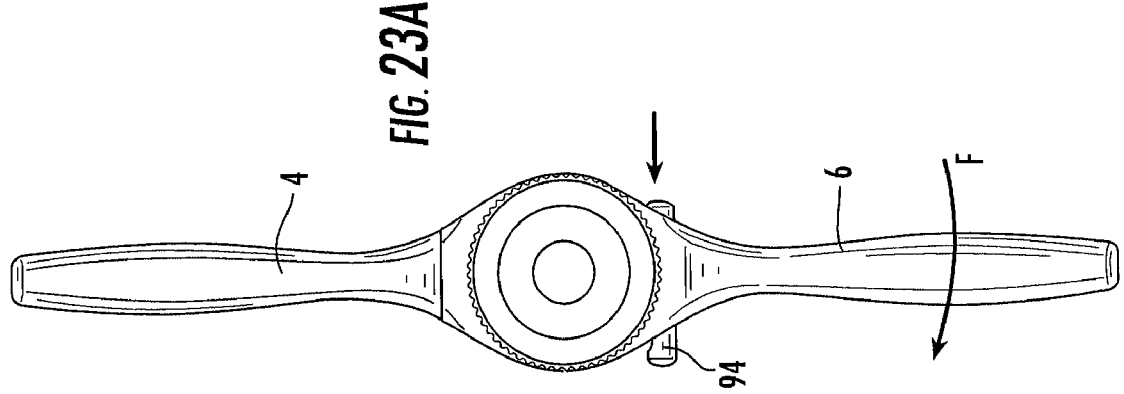

One advantage of the ratchet of the invention is that the rod 94 is moved in the same direction as the working direction of the wrench such that the use of the ratchet is intuitively easy to use. Referring to FIG. 23*a* when the rod 94 is moved to the left as illustrated the ratchet is locked in the clockwise direction (the working direction) such that the force F may be applied to the handle in the same direction as the rod was moved. Similarly, when the rod 94 is moved to the right to the illustrated position shown in FIG. 23*c* the ratchet is locked in the counter-clockwise direction (the working direction) such that a force F may be applied to the handle in the same direction the rod was moved. In operation the user can simply grasp handle and move the rod in the same direction that user wants the wrench to operate. FIG. 23*b* shows the rod in the middle position where the ratchet is locked in both directions.

Figure 24:
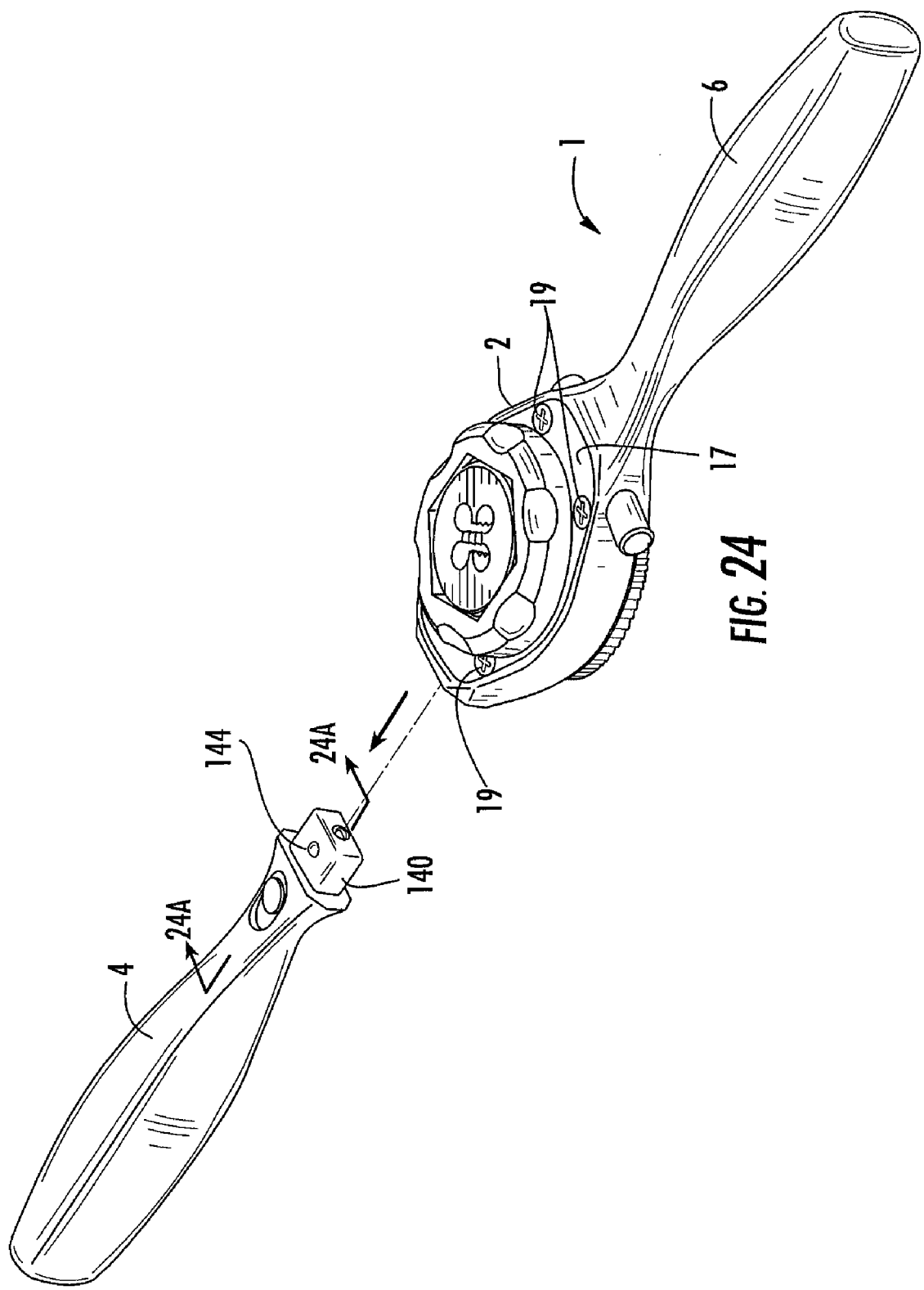
FIG. 24 is a perspective view of the wrench with one handle removed.
Figure 25:
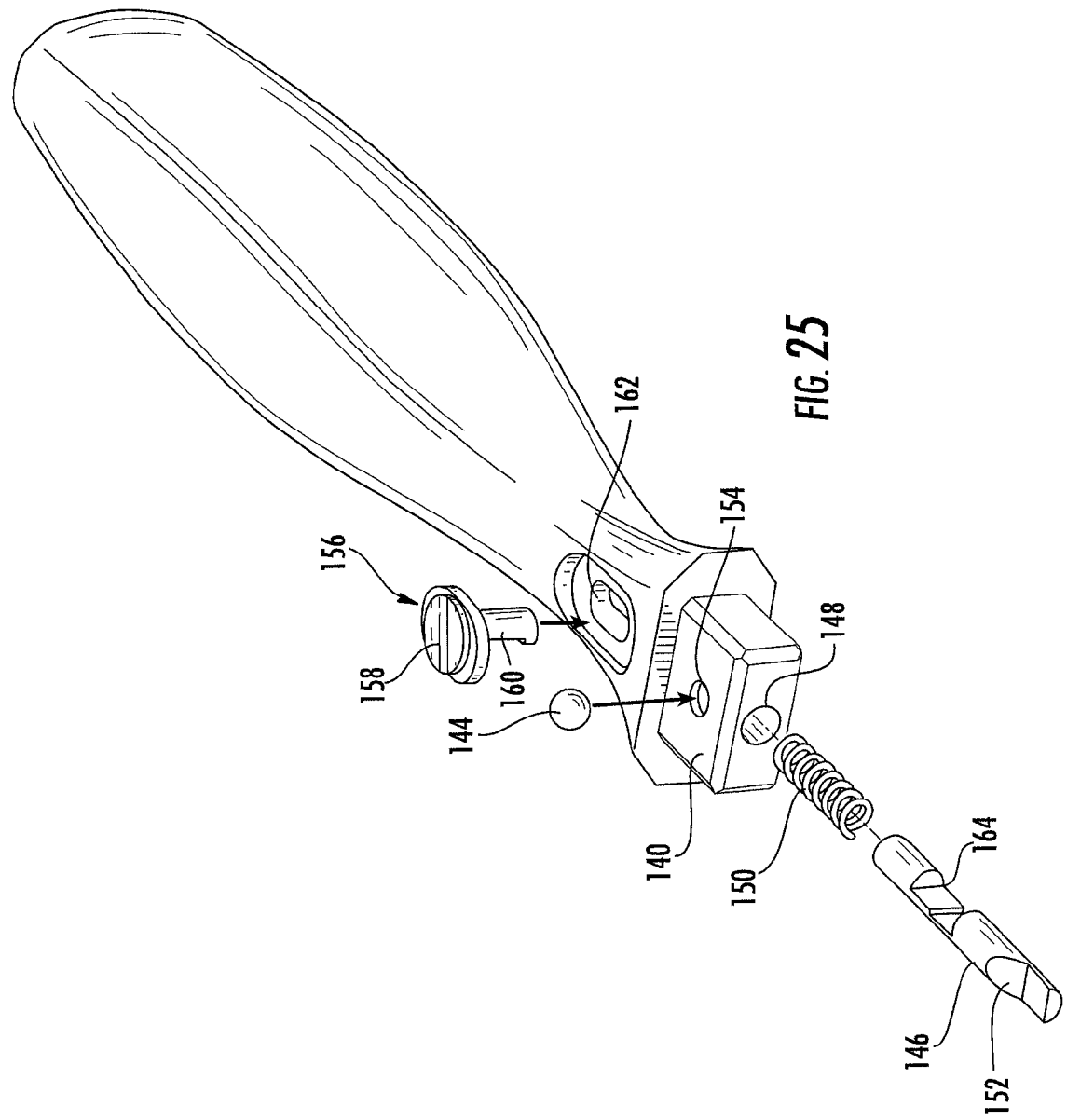
FIG. 25 is an exploded perspective view of the removable handle.

The wrench of the invention further may be provided with a removable handle such that the wrench can be converted from a two handle device to a single handle device. Handle 4 is shown in FIGS. 3, 24 and 25 and includes a protrusion 140 that is closely received in a receptacle 142 formed on housing. A ball 144 biased to an extended position engages a detent formed internally of the receptacle 142 to retain the handle 4 in the housing. A plunger 146 is disposed in a bore 148 that extends along the longitudinal axis of the handle 4. The plunger 146 is biased outwardly toward the end of the handle by a compression spring 150 that is compressed between the end of the bore 148 and the end of the plunger 146. The plunger 146 includes a cam surface 152 that forces the ball 144 to extend through hole 154 formed in protrusion 140. Hole 154 is dimensioned such that the ball cannot pass completely through the hole but the ball can protrude from the hole. A slide button 156 serves both to actuate the mechanism for removal of the handle and to maintain the plunger 146 in the bore 148. The slide button 156 includes a button portion 158 that is exposed to the outside of the handle. Extending from the button portion 158 and into bore 148 through transverse slot 162 is a hook 160. Hook 160 engages a slot 164 formed in the plunger 146 such that as the button is reciprocated in slot 162 hook moves plunger from its extended position to a retracted position. Spring 150 returns plunger 146 to the extended position when no counteracting force is exerted on button 156. In the extended position cam surface 15 forces ball 144 to protrude from hole 154 where the ball can engage a detent in the housing to lock the handle on the housing. In the retracted position of plunger 146, cam surface 152 is displaced from ball 144 such that the ball can retract into hole 154. In this position the ball does not lock the handle into the housing such that the handle may be removed. The handle may be removed to allow the wrench to access fasteners or studs in applications where space is limited and the use of two handles is difficult or impossible.

To assemble the handle, the spring 150 is inserted into bore 148. The plunger is then inserted into the bore and spring 150 is compressed by exerting pressure on the end of the plunger. The plunger is inserted until slot 164 is aligned with slotted hole 162. The hook of button 156 is inserted into slotted hole 162. The engagement of hook with slot 164 prevents the plunger from being expelled from the bore 148 even though spring 150 is compressed in the bore. The ball 144 is inserted into bore 148 and aligned with hole 154. The area around hole 154 is crimped to maintain ball 144 in position adjacent hole 154.

Figure 26:
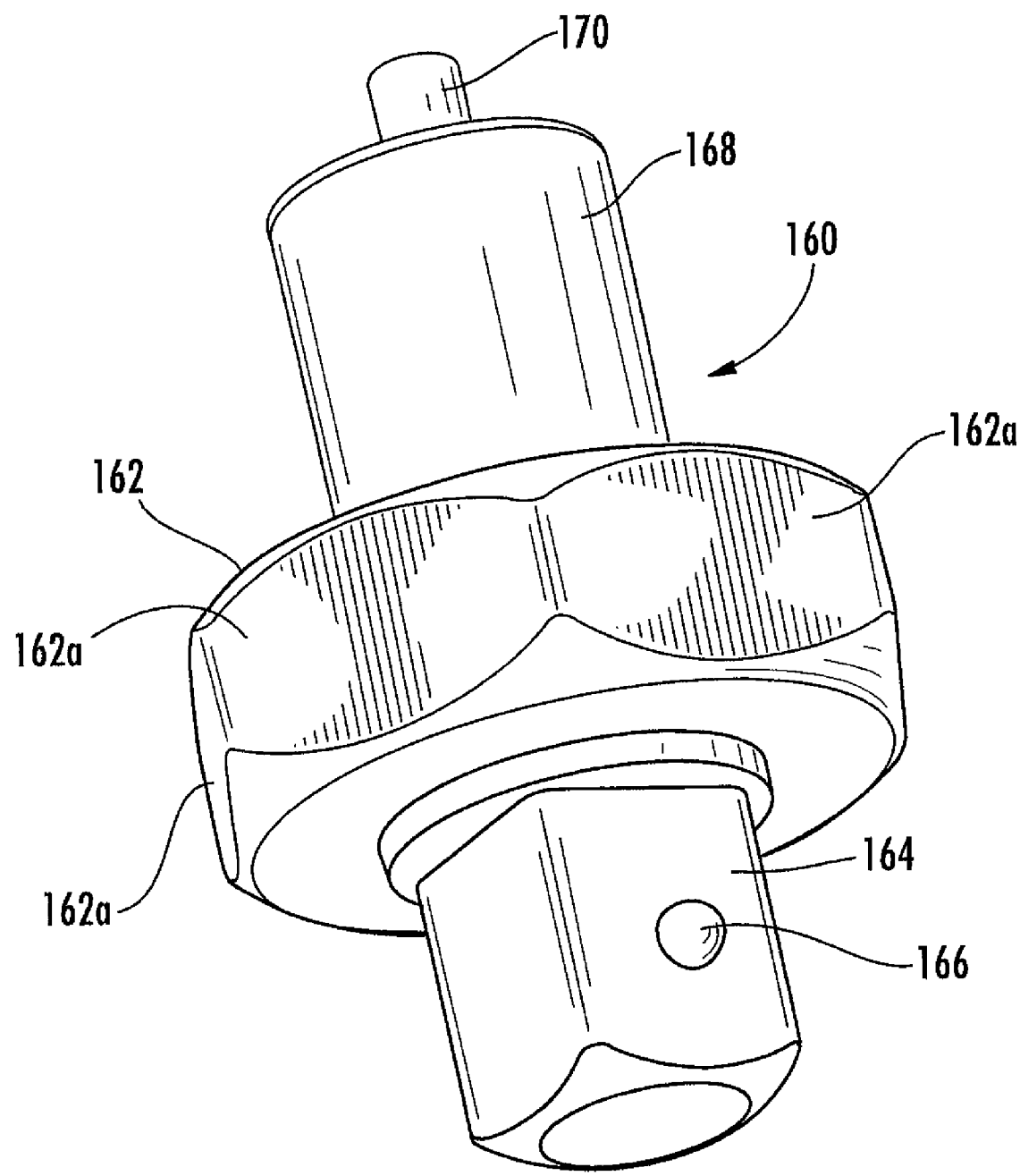
FIG. 26 is a perspective view of one embodiment of a tool for use with the wrench of the invention.

Referring to FIG. 26 a tool for use with wrench 1 is shown that comprises an adapter 160 that allows the wrench 1 to be used with conventional sockets. The adapter comprises a collar 162 having a plurality of faces 162*a* that correspond to the faces 32 of socket 34. The collar 162 can be positioned in the socket 34 such that the adapter is prevented from rotating relative to the body 12. The retaining ring can be rotated to retain the adapter 160 in the socket 34 as previously described. A drive such as square drive 164 extends from one side of collar 162 that may be inserted into the female coupling of a tool such as a standard socket. A spring loaded ball 166 may be provided for locking the tool to the adapter 160. The adapter may further include an extension 168 extending from the side of the collar 162 opposite drive 164. The extension 168 may extend into space 29 between the guides 16 such that the engagement of the guides with the adapter may provide further stability and alignment between the tool and the wrench. A push button release 170 may also be provided to release the ball 166 from the socket or other tool. While the tool has been described with specific reference to the adapter 160, the tool may comprise any tool that can advantageously be rotated by the wrench of the invention. For example, a tap may be provided with a collar such as collar 162 that can be retained by the socket 34. Further, the tool may comprise other tools such as screw drivers tips, drill bits or the like that are provided with a collar such as collar 162 formed integrally therewith or formed as a separate component. Further, square drive 164 of adapter 160 may be replaced by a chuck or female receptacle.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A wrench comprising:
   a first handle and a second handle connected to a housing;
   a socket rotatably supported in said housing for ratcheting movement relative to said housing, wherein said socket is located in a body rotatable relative to said housing;
   a plurality of gear teeth surrounding said body;
   a first pawl and a second pawl individually or simultaneously engageable with said gear teeth;
   a camming surface movable relative to said first pawl for pulling said first pawl away from said gear teeth, wherein said camming surface is formed on a rod moveable in a first direction and said working direction being the same direction as the first direction; and
   a retaining member for releasably securing a device in said socket, wherein said retaining member moves between a first position and a second position and includes a plurality of spaced apart portions that extend over said device in said second position,
   wherein in said second position, said plurality of spaced apart portions of said retaining member engaging a plurality of faces of said device, each of said faces of said device being spaced apart from each other around the periphery of said device.

2. The wrench of claim 1 further comprising an adapter that allows the wrench to be used with conventional sockets.

3. A wrench comprising:
   a first handle and a second handle connected to a housing;
   a socket rotatably supported in said housing for ratcheting movement relative to said housing, wherein said socket is located in a body rotatable relative to said housing;
   a plurality of gear teeth surrounding said body;
   a first pawl and a second pawl individually or simultaneously engageable with said gear teeth;
   a camming surface movable relative to said second pawl for pulling said second pawl away from said gear teeth, wherein said camming surface is formed on a rod moveable in a second direction and said second working direction being the same direction as said second direction; and
   a retaining member for releasably securing a device in said socket, wherein said retaining member moves between a first position and a second position and includes a plurality of spaced apart portions that extend over said device in said second position,
   wherein in said second position, said plurality of spaced apart portions of said retaining member engaging a plurality of faces of said device, each of said faces of said device being spaced apart from each other around the periphery of said device.

4. The wrench of claim 3 further comprising an adapter that allows the wrench to be used with conventional sockets.

5. A wrench comprising:
   a handle connected to a housing;
   a socket supported on said housing and defined by a plurality of faces, said housing dimensioned to receive a device; and
   a plurality of guides for orienting a member relative to said socket, said guides being mounted in a rotatable body, wherein said guides are movable by a camming member, wherein the camming member includes a plurality of tracks and wherein a portion of the guides extend into the tracks.

6. The wrench of claim 5 wherein one of the plurality of guides is associated with one of the plurality of tracks.

7. The wrench of claim 5 wherein the camming member is rotatable relative to the housing.

8. The wrench of claim 5 wherein the camming member defines an aperture.

9. The wrench of claim 5 further comprising a second handle secured to said housing, wherein said second handle is removable from said housing.

10. The wrench of claim 5 wherein said socket includes a peripheral wall, said wall preventing the rotation of said device relative to said socket.

11. The wrench of claim 5 wherein a socket is rotatably supported in said housing for ratcheting movement relative to said housing.

12. The wrench of claim 5 further comprising an adapter that allows the wrench to be used with conventional sockets.

13. A wrench comprising:
   a handle connected to a housing;
   a socket supported on said housing and defined by a plurality of faces, said housing dimensioned to receive a device; and
   a plurality of guides for orienting a member relative to said socket, said guides being mounted in a rotatable body,
   wherein said guides are movable by a camming member and wherein the guides are pivoted at one end such that another end of the guides are movable toward and away from one another, and
   further including a retainer supported on said housing and movable between a first position and a second position, said retainer when in said first position at least partially overlaying said socket.

14. The wrench of claim 13 further comprising an adapter that allows the wrench to be used with conventional sockets.

15. The wrench of claim 13 wherein the camming member is rotatable relative to the housing.

16. The wrench of claim 13 wherein the camming member defines an aperture.

17. The wrench of claim 13 further comprising a second handle secured to said housing, wherein said second handle is removable from said housing.

18. The wrench of claim 13 wherein said socket includes a peripheral wall, said wall preventing the rotation of said device relative to said socket.

19. The wrench of claim 13 wherein a socket is rotatably supported in said housing for ratcheting movement relative to said housing.

20. A wrench comprising:
   a handle connected to a housing;
   a socket rotatably supported in said housing for ratcheting movement relative to said housing, wherein said socket is located in a body, said body being rotatable relative to said housing;
   a retaining member for releasably securing a device in said socket, wherein said retaining member moves between a first position and a second position and includes a portion that extends over said device in said second position;
   a pawl engageable with a plurality of gear teeth, wherein said gear teeth surround said body; and
   a camming surface movable relative to said pawl for pulling said pawl away from said gear teeth, wherein said camming surface is formed on a rod moveable in a first direction, and wherein a working direction of said handle being the same direction as the first direction.

21. The wrench of claim 20, further including a second pawl engageable with said gear teeth, wherein said camming surface is formed on a rod moveable in a second direction and said second working direction being the same direction as said second direction.

22. The wrench of claim 20 further comprising an adapter that allows the wrench to be used with conventional sockets.

23. The wrench of claim 20 further comprising a second handle secured to said housing, wherein said second handle is removable from said housing.

24. The wrench of claim 20 wherein said socket includes a peripheral wall, said wall preventing the rotation of said device relative to said socket.

25. A wrench comprising:
a first handle and a second handle connected to a housing;
a socket rotatably supported in said housing for ratcheting movement relative to said housing, wherein said socket is located in a body rotatable relative to said housing;
a plurality of gear teeth surrounding said body;
a first pawl and a second pawl individually or simultaneously engageable with said gear teeth;
a camming surface movable relative to said first pawl and said second pawl for selectively pulling said first pawl and said second pawl away from said gear teeth, wherein said camming surface is formed on a rod selectively positionable in a first position, a second position, and a third position; and
a retaining member for releasably securing a device in said socket, wherein said retaining member moves between a first position and a second position and includes a plurality of spaced apart portions that extend over said device in said second position,
wherein in said second position, said plurality of spaced apart portions of said retaining member engaging a plurality of faces of said device, each of said faces of said device being spaced apart from each other around the periphery of said device.

26. The wrench of claim 25 further comprising an adapter that allows the wrench to be used with conventional sockets.

27. The wrench of claim 25 wherein said socket includes a peripheral wall, said wall preventing the rotation of said device relative to said socket.

28. A wrench comprising:
a handle connected to a housing;
a socket supported on said housing and defined by a plurality of faces, said housing dimensioned to receive a device;
a plurality of guides for orienting a member relative to said socket, said guides being mounted in a rotatable body, wherein said guides are movable by a camming member, wherein the camming member includes a plurality of tracks; and
further including a retainer supported on said housing and movable between a first position and a second position, said retainer when in said first position at least partially overlaying said socket.

29. The wrench of claim 28 further comprising an adapter that allows the wrench to be used with conventional sockets.

30. The wrench of claim 28 wherein one of the plurality of guides is associated with one of the plurality of tracks.

31. The wrench of claim 28 wherein the camming member is rotatable relative to the housing.

32. The wrench of claim 28 wherein the camming member defines an aperture.

33. The wrench of claim 28 further comprising a second handle secured to said housing, wherein said second handle is removable from said housing.

34. The wrench of claim 28 wherein said socket includes a peripheral wall, said wall preventing the rotation of said device relative to said socket.

35. The wrench of claim 28 wherein a socket is rotatably supported in said housing for ratcheting movement relative to said housing.

\* \* \* \* \*